US007595127B2

(12) United States Patent
Seabaugh et al.

(10) Patent No.: US 7,595,127 B2
(45) Date of Patent: Sep. 29, 2009

(54) NANO-COMPOSITE ELECTRODES AND METHOD OF MAKING THE SAME

(75) Inventors: Matthew M. Seabaugh, Columbus, OH (US); Scott L. Swartz, Columbus, OH (US)

(73) Assignee: NexTech Materials, Ltd., Lewis Center, OH (US)

(*) Notice: Subject to any disclaimer, the term of this patent is extended or adjusted under 35 U.S.C. 154(b) by 0 days.

(21) Appl. No.: 10/185,496

(22) Filed: Jun. 28, 2002

(65) Prior Publication Data

US 2003/0027033 A1    Feb. 6, 2003

Related U.S. Application Data

(60) Provisional application No. 60/302,159, filed on Jun. 29, 2001.

(51) Int. Cl.
  *H01M 4/86* (2006.01)
  *H01M 4/88* (2006.01)
  *C04B 35/64* (2006.01)
(52) U.S. Cl. .............................. 429/44; 429/40; 429/41; 429/45; 502/101; 264/618; 427/115
(58) Field of Classification Search .................. 429/30, 429/40, 33, 306, 317, 304, 322, 323, 41, 429/38, 247, 44, 213, 26, 31, 45; 501/128, 501/124, 134; 427/226, 126.3, 115; 423/593.1, 423/599; 705/37; 29/623.5; 252/500, 519.1; 264/42; 361/501; 156/89.16; 524/435; 204/256; 96/4
See application file for complete search history.

(56) References Cited

U.S. PATENT DOCUMENTS 6,117,582 A * 9/2000 Wallin et al. .................. 429/45

6,203,676 B1 * 3/2001 Phillips et al. ............... 204/256
6,692,855 B1 * 2/2004 Aizawa et al. ................. 429/30

FOREIGN PATENT DOCUMENTS

WO    WO99/54946    * 10/1999

OTHER PUBLICATIONS

STG Particle Size / Screen Mesh Comparison http://www.wovenwire.com/reference/particle-size-print.htm.*
Itoh et al., "Configurational and Electrical Behavior of Ni-YSZ Cermet with Novel Microstructure for Solid Oxide Fuel Cell Anodes," *J. Electrochem. Soc.* 144 (2) 641-646 (1997).
Kim et al., "Preparation of nanocrystalline nickel oxide-yttria-stabilized zirconia composite powder by solution combustion with ignition of glycinen fuel," *J. Mater. Res.* 16 (12) 3621-27 (2001).

(Continued)

*Primary Examiner*—Robert Hodge
(74) *Attorney, Agent, or Firm*—Porter Wright Morris & Arthur LLP

(57) ABSTRACT

A method of making ceramic electrode materials comprising intimate mixtures of two or more components, including at least one nanoscale ionically conducting ceramic electrolyte material (e.g., yttrium-stabilized zirconia, gadolinium-doped ceria, samarium-doped ceria, etc.) and at least one powder of an electrode material, which may be an electrically conducting ceramic electrode material (e.g., lanthanum strontium manganite, praseodymium strontium manganese iron oxide, lanthanum strontium ferrite, lanthanum strontium cobalt ferrite, etc.) or a precursor of a metallic electrode material (e.g., nickel oxide, copper oxide, etc.). The invention also includes anode and cathode coatings and substrates for solid oxide fuel cells prepared by this method.

39 Claims, 9 Drawing Sheets

OTHER PUBLICATIONS

Fukui et al., "Long-Term Stability of Ni-YSZ Anode with a New Microstructure Prepared from Composite Powder," *Electrochem. & Solid-State Letters* 1 (3) 120-122 (1998).

Brown et al., "Structure/Performance Relations for Ni/Yttria-Stabilized Zirconia Anodes for Solid Oxide Fuel Cells," *J. Electrochem. Soc.* 147 (2) 475-485 (2000).

Lee et al., "Quantitative analysis of microstructure and its related electrical property of SOFC anode, Ni-YSZ cermet," *Solid State Ionics* 148 15-26 (2002).

Murray et al., "Electrochemical performance of $(La,Sr)(Co,Fe)O_3$-$(Ce,Gd)O_3$ composite cathodes," *Solid State Ionics* 148 27-34 (2002).

Murray et al., "$(La,Sr)MnO_3$-$(Ce,Gd)O_{2-x}$ composite cathodes for solid oxide fuel cells," *Solid State Ionics* 143 265-273 (2001).

Tanner et al., "The Effect of Porous Composite Electrode Structure on Solid Oxide Fuel Cell Performance," *J. Electrochem. Soc.* 144 (1) 21-30 (1997).

Dusastre et al., "Optimization of composite cathodes for intermediate temperature SOFC applications," *Solid State Ionics* 126 163-174 (1999).

Kim et al., "Characterization of LSM-YSZ composite electrode by ac impedance spectroscopy," *Solid State Ionics* 143 379-389 (2001).

* cited by examiner

NANO-COMPOSITE ELECTRODES AND METHOD OF MAKING THE SAME

RELATED APPLICATION

This application claims the benefit of U.S. provisional patent application No. 60/302,159, filed Jun. 29, 2001.

FIELD OF THE INVENTION

The invention relates to a method of making ceramic electrode materials comprising mixtures of two or more components, including at least one nanoscale ionically conducting ceramic electrolyte material (e.g., yttrium-stabilized zirconia, gadolinium-doped ceria, samarium-doped ceria, etc.) and at least one powder of an electrode material, which may be an electrically conducting ceramic electrode material (e.g., lanthanum strontium manganite, praseodymium strontium manganese iron oxide, lanthanum strontium ferrite, lanthanum strontium cobalt ferrite, etc.) or a precursor of a metallic electrode material (e.g., nickel oxide, copper oxide, etc.), as well as electrode products prepared by this method. Such nano-composite electrodes are useful for several electrochemical system applications, such as solid oxide fuel cells, ceramic oxygen generation systems, gas sensors, ceramic membrane reactors, and ceramic electrochemical gas separation systems.

BACKGROUND OF THE INVENTION

Fuel cells are environmentally clean, quiet, and highly efficient devices for generating electricity and heat from hydrogen, natural gas, methanol, propane, and other hydrocarbon fuels. Fuel cells convert the energy of a fuel directly into energy—electricity and heat—by an electrochemical process, without combustion or moving parts. Advantages include high efficiency and very low release of polluting gases (e.g. $NO_X$) into the atmosphere. Of the various types of fuel cells, the solid oxide fuel cell (SOFC) offers advantages of high efficiency, low materials cost, minimal maintenance, and direct utilization of various hydrocarbon fuels without extensive reforming. SOFC systems operating with natural gas as a fuel can achieve power generation efficiencies in the range of 40 to 45 percent, and even higher efficiencies are possible with hybrid systems. Power is generated in a solid oxide fuel cell by the transport of oxygen ions (from air) through a ceramic electrolyte membrane where hydrogen and carbon monoxide from a hydrocarbon (e.g., natural gas) are consumed to form water and carbon dioxide. The ceramic electrolyte membrane is sandwiched between electrodes where the power-generating electrochemical reactions occur. Oxygen molecules from air are converted to oxygen ions at the air electrode (cathode), and these oxygen ions react with hydrogen and carbon monoxide to form water and carbon dioxide at the fuel electrode (anode).

The same types of materials are used in most of the SOFC systems currently under development. Compositions used for the ceramic electrolyte membrane material include yttrium-stabilized zirconia (YSZ), gadolinium-doped ceria (GDC), and samarium-doped ceria (SDC), among others. The air electrode (cathode) is a ceramic material having compositions such as lanthanum strontium manganite (LSM), lanthanum strontium ferrite (LSF), lanthanum strontium cobalt ferrite (LSCF), samarium strontium cobaltite (SSC), praseodymium strontium manganite (PSM), and praseodymium strontium manganese iron oxide (PSMF), among others. The fuel electrode (anode) is a composite (cermet) mixture of a ceramic electrolyte material (e.g., YSZ, GDC or SDC) and a metal (e.g., nickel or copper). The anode material typically is produced as a mixture of the electrolyte material (e.g., YSZ or GDC) and the oxide of the metal (nickel oxide or copper oxide); prior to operation of the SOFC, the oxide in the composite anode is reduced to the corresponding metal.

Currently, most developmental SOFC systems operate at relatively high temperatures (i.e., 800 to 950° C.). At these high temperatures, the electrode materials provide suitable performance using conventional means of preparation. However, at these high temperatures, with current anode materials, hydrocarbon fuels must first be converted to a mixture of hydrogen and carbon monoxide (for example, by reacting the hydrocarbon with steam); the mixture of hydrogen and carbon monoxide is then delivered to the SOFC where power is generated. Without this external "reforming" step, carbon would deposit onto the anodes of the SOFC and performance would degrade rapidly. Operation of SOFCs at lower temperatures (650 to 750° C.) would allow internal reforming at the anode without carbon deposition, thus reducing size and cost of the system and increasing overall efficiency. Lower operating temperatures also will minimize adverse chemical reactions between component materials, minimize adverse effects of thermal expansion mismatches between component materials, reduce cost by allowing less expensive metals to be used for interconnects and gas manifolds, and reduce the size and weight of the SOFC power generation system by lessening requirements on heat exchangers and thermal insulation.

However, it has been difficult to achieve high SOFC power densities at low temperatures in solid oxide fuel cells because of increased electrolyte resistance and inefficiency of the electrode materials. It has been demonstrated that reducing the thickness of electrolyte membranes lowers electrolyte resistance. This has been achieved in SOFCs with planar geometries by using one of the porous electrodes (typically the anode) as the bulk structural support (about one millimeter thick), depositing a dense thin film (about ten microns) of the electrolyte material on the porous anode substrate, and subsequently depositing the opposite electrode (cathode) as a porous film (about fifty microns) on the electrolyte film surface. Very high SOFC power densities have been achieved at temperatures of 750 to 800° C. with planar SOFCs produced with this type of configuration. However, even better SOFC performance and lower temperature operation will be achieved by using improved electrode (cathode and anode) materials.

Two approaches have been demonstrated for improving low-temperature performance of cathodes in solid oxide fuel cells. The first approach involves replacement of lanthanum strontium manganite (LSM), which conducts electricity solely via electron transport, with mixed-conducting ceramic electrode materials, i.e., materials that conduct electricity via transport of both oxygen ions and electrons. Examples of mixed-conducting electrode materials include $(La,Sr)(Mn,Co)O_3$ (LSMC), $(Pr,Sr)MnO_3$ (PSM), $(Pr,Sr)(Mn,Co)O_3$ (PSMC), $(La,Sr)FeO_3$ (LSF), and $(La,Sr)(Co,Fe)O_3$ (LSCF). The second approach to improving low-temperature cathode performance involves addition of electrolyte material to the electrode material. This improvement is due to increasing the volume of triple-point (air/electrode/electrolyte) regions where electrochemical reactions occur. This enhancement is most effective in LSM when ceria-based electrolytes (SDC or GDC) are added or when the particle size of the component (electrolyte and electrode) materials is reduced. This composite cathode approach also has been shown to provide enhancements for mixed-conducting electrode materials such as LSF and LSCF.

In order to improve anode performance, regardless of operating temperature, it is desired to reduce the respective particle sizes of the metallic and ceramic components of the cermet anode material. The particle size reduction results in an increase in the volume of triple-point (gas/nickel/electrolyte) regions where electrochemical reactions occur. When operation via internal reforming is desired, ceria-based electrolytes may be preferred over YSZ.

Accordingly, there is a need in the art for processes for preparing improved powder mixtures of ceramic electrolyte and electrode materials, and high-performance anode and cathode materials for solid oxide fuel cells prepared using such processes. Specifically, by achieving these powder mixtures on a nanoscale (e.g., less than 100 nm in dimension), improved electrode performance will be obtained. Other applications where advanced electrode materials are needed include ceramic electrochemical gas separation systems, gas sensors, and ceramic membrane reactors.

SUMMARY OF THE INVENTION

One embodiment of the present invention provides a method of making a ceramic electrode material, including the steps of providing a nanoscale electrolyte powder having a surface area $\geq 20$ m$^2$/gram, providing an electrode powder, mixing the nanoscale electrolyte powder with the electrode powder by a mixing method selected from attrition milling and ball milling, and calcining the milled powder mixture. Preferably, the nanoscale electrolyte powder has a surface area $\geq 50$ m$^2$/gram, and more preferably, $\geq 100$ m$^2$/gram. The method also may include the step of milling the calcined powder mixture or the step of calcining the electrolyte powder before mixing. The mixing step may include the steps of milling the electrolyte powder and the electrode powder in the presence of a surfactant, drying the milled powder mixture, and sieving the milled powder mixture.

The nanoscale electrolyte powder may be yttrium-stabilized zirconia, a doped ceria electrolyte material, barium zirconate, scandium-doped zirconia, a lanthanum gallate based ceramic electrolyte material, a bismuth oxide based electrolyte material, or a combination thereof. The electrode powder may be (1) an electrically conducting ceramic material, or (2) a powder precursor to a metal selected from nickel, copper, and combinations thereof.

When the electrode powder is an electrically conducting ceramic material, the powder mixture preferably comprises 20 to 50 volume percent of the electrolyte material. The electrode powder may be a perovskite ceramic electrode material that satisfies the formula $(A_{1-x}B_x)(C_{1-y}D_y)O_{3-z}$, where A is a lanthanide element, B is an alkaline earth element, and C and D are transition elements, preferably lanthanum strontium manganite, praseodymium strontium manganese iron oxide, lanthanum strontium ferrite, lanthanum strontium cobalt ferrite, lanthanum calcium manganite, lanthanum calcium cobalt ferrite, praseodymium strontium manganite, praseodymium strontium ferrite, samarium strontium cobaltite, or combinations thereof.

When the electrode powder is a powder precursor to a metal, the powder mixture preferably comprises 30 to 70 volume percent of the electrolyte material. The metal precursor may be nickel oxide, nickel carbonate, nickel nitrate, nickel hydroxide, copper oxide, copper carbonate, copper nitrate, or combinations thereof.

Another embodiment of the invention provides a method of making a ceramic electrode material, including the steps of providing a nanoscale electrolyte powder having a surface area $\geq 20$ m$^2$/gram, providing an electrode powder comprising an electrically conducting ceramic material, and mixing the nanoscale electrolyte powder with the electrode powder by a method selected from attrition milling and ball milling; and calcining the milled powder mixture. Preferably, the nanoscale electrolyte powder has a surface area $\geq 50$ m$^2$/gram, and more preferably, $\geq 100$ m$^2$/gram. The method also may include the step of milling the calcined powder mixture or the step of calcining the electrolyte powder before mixing. The mixing step may include the steps of milling the electrolyte powder and the electrode powder in the presence of a surfactant, drying the milled powder mixture, and sieving the milled powder mixture.

The nanoscale electrolyte powder may be yttrium-stabilized zirconia, a doped ceria electrolyte material, barium zirconate, scandium-doped zirconia, a lanthanum gallate based ceramic electrolyte material, a bismuth oxide based electrolyte material, or a combination thereof. The powder mixture preferably comprises 20 to 50 volume percent electrolyte powder.

The electrode powder may be a perovskite ceramic electrode material that satisfies the formula $(A_{1-x}B_x)(C_{1-y}D_y)O_{3-z}$, where A is a lanthanide element, B is an alkaline earth element, and C and D are transition elements, preferably, lanthanum strontium manganite, praseodymium strontium manganese iron oxide, lanthanum strontium ferrite, lanthanum strontium cobalt ferrite, lanthanum calcium manganite, lanthanum calcium cobalt ferrite, praseodymium strontium manganite, praseodymium strontium ferrite, samarium strontium cobaltite, and combinations thereof.

The invention also encompasses a cathode coating for a solid oxide fuel cell in which the coating comprises a ceramic electrode material prepared by the above-described process and a cathode substrate for a solid oxide fuel cell in which the substrate comprises a ceramic electrode material prepared by the above-described process.

Yet another embodiment of the invention provides a method of making a ceramic electrode material, including the steps of providing a nanoscale electrolyte powder having a surface area $\geq 20$ m$^2$/gram, providing an electrode powder comprising a powder precursor to a metal selected from nickel, copper, and combinations thereof, mixing the nanoscale electrolyte powder with the electrode powder by a method selected from attrition milling and ball milling, and calcining the milled powder mixture. Preferably, the nanoscale electrolyte powder has a surface area $\geq 50$ m$^2$/gram, and more preferably, $\geq 100$ m$^2$/gram. The method also may include the step of milling the calcined powder mixture or the step of calcining the electrolyte powder before mixing. The mixing step may include the steps of milling the electrolyte powder and the electrode powder in the presence of a surfactant, drying the milled powder mixture, and sieving the milled powder mixture.

The nanoscale electrolyte powder may be yttrium-stabilized zirconia, a doped ceria electrolyte material, barium zirconate, scandium-doped zirconia, a lanthanum gallate based ceramic electrolyte material, a bismuth oxide based electrolyte material, or a combination thereof. Preferably, the powder mixture comprises 30 to 70 volume percent electrolyte powder. The metal precursor may be nickel oxide, nickel carbonate, nickel nitrate, nickel hydroxide, copper oxide, copper carbonate, copper nitrate, or combinations thereof.

The invention also encompasses an anode coating for a solid oxide fuel cell in which the coating comprises a ceramic electrode material prepared by the above-described process and an anode substrate for a solid oxide fuel cell in which the substrate comprises a ceramic electrode material prepared by the above-described process.

Another embodiment of the invention provides a method of making a ceramic electrode material, including the steps of providing a nanoscale electrolyte powder comprising a doped ceria electrolyte material having a surface area ≧100 m²/gram, providing an electrode powder comprising lanthanum strontium ferrite, and mixing the doped ceria electrolyte material with the lanthanum strontium ferrite powder by attrition milling or ball milling to form a mixture comprising 20 to 50 volume percent doped ceria electrolyte material. The method also may include the step of calcining the milled powder mixture at a temperature of at least 850° C.

Yet another embodiment of the invention provides a method of making a ceramic electrode material, including the steps of providing a nanoscale electrolyte powder comprising a doped ceria electrolyte material having a surface area ≧100 m²/gram, providing an electrode powder comprising lanthanum strontium cobalt ferrite, and mixing the doped ceria electrolyte material with the lanthanum strontium cobalt ferrite powder by attrition milling or ball milling to form a mixture comprising about 20 to 50 volume percent doped ceria electrolyte material. The method also may include the step of calcining the milled powder mixture at a temperature of at least 850° C.

Still another embodiment of the invention provide a method of making a ceramic electrode material, including the steps of providing a nanoscale electrolyte powder having a surface area ≧20 m²/gram, dispersing the electrolyte powder in water having an adjusted pH <7, dissolving an electrode powder in the dispersion, the electrode powder being a water soluble precursor to a metal selected from nickel, copper, silver, and combinations thereof, adding an aqueous solution of a base to the dispersion to cause precipitation of the metal precursor on the surface of the nanoscale electrolyte powder, and calcining the precipitated solids. The nanoscale electrolyte powder preferably has a surface area ≧50 m²/gram, and more preferably, ≧100 m²/gram. Preferably, the precipitated solids comprise 30 to 70 volume percent of the electrolyte material. The nanoscale electrolyte powder may be yttrium-stabilized zirconia, a doped ceria electrolyte material, barium zirconate, scandium-doped zirconia, a lanthanum gallate based ceramic electrolyte material, a bismuth oxide based electrolyte material, or combinations thereof.

The invention also encompasses an anode coating for a solid oxide fuel cell in which the coating comprises a ceramic electrode material prepared by the above-described precipitation process and an anode substrate for a solid oxide fuel cell in which the substrate comprises a ceramic electrode material prepared by this process.

From the foregoing disclosure and the following more detailed description of various preferred embodiments it will be apparent to those skilled in the art that the present invention provides a significant advance in the technology and art of ceramic cathode and anode materials for solid oxide fuel cells, and other electrochemical device applications. Particularly significant in this regard is the potential the invention affords for improving performance of solid oxide fuel cells, reducing the operating temperature of solid oxide fuel cells, and/or allowing efficient operation of solid oxide fuel cells with internal reforming of hydrocarbon fuels. Additional features and advantages of various preferred embodiments will be better understood in view of the detailed description provided below.

DETAILED DESCRIPTION OF THE PREFERRED EMBODIMENT(S)

Figure 1:
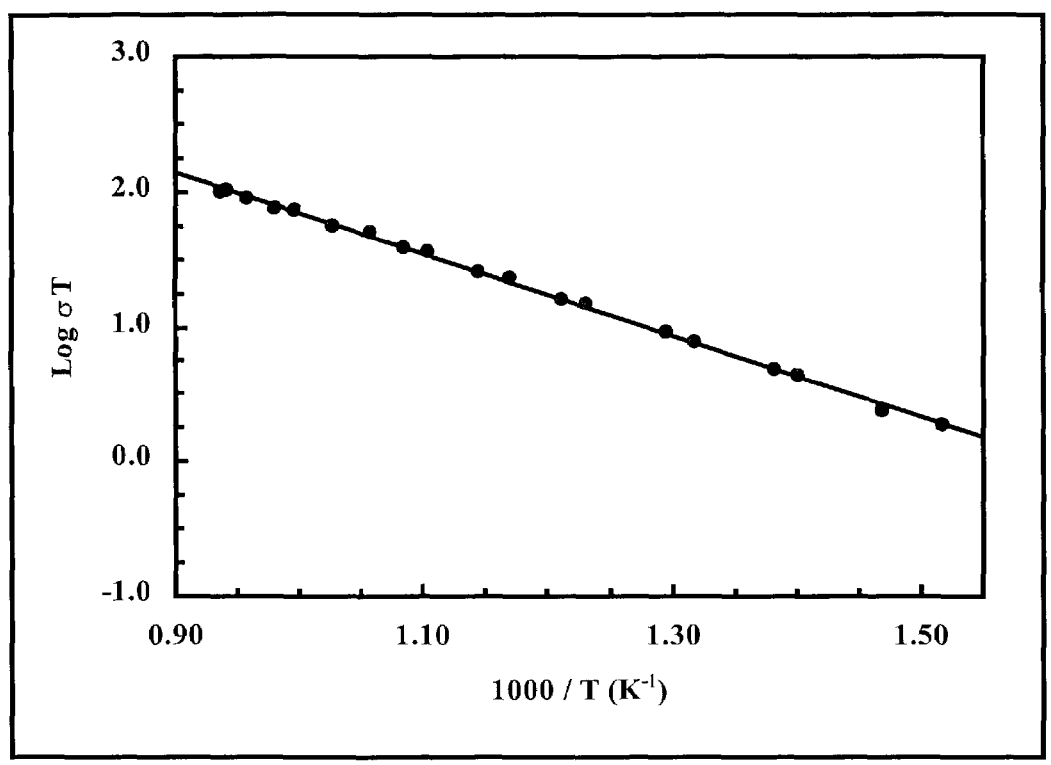
FIG. 1 is an Arrhenius plot showing temperature dependence of ionic conductivity for GDC ceramic electrolyte materials prepared as described under Example 3.

The present invention includes processes for preparing intimate mixtures of ceramic electrolyte and ceramic electrode (cathode or anode) materials comprising a nanoscale powder of an electrolyte material and a powder of an electrode (cathode or anode) material by mixing these two powders in such a way that the ceramic electrolyte powder becomes intimately mixed with the electrode powder. The present invention also includes the nano-composite electrode (cathode or anode) materials produced by the various processes described in this disclosure.

The nanoscale electrolyte powder (e.g., YSZ or GDC) has a high surface area $\geq 20$ m$^2$/gram, preferably $\geq 50$ m$^2$/gram, and more preferably $\geq 100$ m$^2$/gram. The nanoscale electrolyte powder may be prepared by hydrothermal synthesis or other methods know to those skilled in the art. The nanoscale electrolyte powder may be a combination of electrolyte powders. The powder electrode materials preferably are micron-sized (or sub-micron sized), although other powder particle sizes also may be used. The powder electrode materials may be a combination of powder electrode materials.

For a nano-composite cathode material, the electrolyte powder is mixed with an electrode powder that can be an electrically conducting ceramic electrode material, preferably a perovskite ceramic electrode material (e.g., LSM, PSM, PSMF, LSF, or LSCF), made by conventional processes of ball milling and calcination, by chemical methods such as the glycine-nitrate process, or by other means known to those skilled in the art. For a nano-composite cermet anode, the electrolyte powder is mixed with a precursor to the metal component of the cermet anode (e.g., nickel oxide, nickel carbonate). These precursors typically can be purchased from various chemical suppliers as relatively coarse powders and then reduced in particle size by methods such as ball milling or attrition milling. Alternatively, chemical methods may be used to prepare precursor metal oxides or solid solutions of nickel oxide with other metal oxides, depending on the desired anode formulation.

The processes used to prepare nano-composite cathode materials of this invention may include the steps of: (1) providing a nanoscale electrolyte (e.g., YSZ or GDC) powder, and, optionally, calcining the nanoscale electrolyte powder to tailor its surface area; (2) preparing an electrode powder (e.g., LSM, PSMF, LSF, or LSCF) by ball milling stoichiometric amounts of carbonate and/or oxide precursors, drying and sieving the milled precursor powder, calcining the dried precursor powder mixture to form the perovskite crystalline phase, ball milling or attrition milling of the perovskite electrode powder, followed by drying and sieving the milled perovskite electrode powder; (3) preparing an intimate mixture of nanoscale electrolyte and perovskite electrode powders by ball milling or attrition milling of the electrolyte and electrode powders, optionally with the addition of a suitable surfactant, followed by drying and sieving the milled composite powder; and (4) optionally, calcining the electrolyte/electrode powder mixture at an elevated temperature to tailor the surface area to that desired for the specific ceramic fabrication method (e.g., tape casting or screen printing) used for making the cathode layers of SOFC elements. Preferably, the resulting powder mixture comprises 20 to 50 volume percent electrolyte material.

The method of making nano-composite anode materials of this invention may include the steps of: (1) preparing a nanoscale electrolyte (e.g., YSZ or GDC) powder and, optionally, calcining the nanoscale electrolyte powder to tailor its surface area; (2) obtaining a powder precursor to a metallic electrode material (e.g., nickel oxide or nickel carbonate); 3) optionally, ball milling or attrition milling the precursor powder to reduce its particle size, followed by drying and sieving the milled nickel precursor powder; (4) preparing an intimate mixture of nanoscale electrolyte and nickel precursor powders by ball milling or attrition milling of the electrolyte and nickel precursor powders, optionally with the addition of a suitable surfactant, followed by drying and sieving of the milled composite powder; and (5) optionally, calcining the mixture of electrolyte and nickel precursor powders at an elevated temperature to reduce surface area to that desired for the specific ceramic fabrication method (e.g., tape casting or screen printing) used for making the anode layers of SOFC elements. Preferably, the resulting powder mixture comprises 30 to 70 volume percent electrolyte material.

Alternatively, the present method of making nano-composite anode materials may include the steps of (1) providing a nanoscale electrolyte powder; (2) dispersing the electrolyte powder in water, optionally with adjustment of the pH to be <7; (3) dissolving an electrode powder in the dispersion, the electrode powder being a water soluble precursor to a metal (e.g., nickel, copper, or silver); (4) adding the dispersion to an aqueous solution of a base (e.g., ammonium hydroxide or tetra methyl ammonium hydroxide) to cause precipitation of the metal precursor on the surface of the nanoscale electrolyte powder; and (5) calcining the precipitated solid product after separating the solid from the suspension.

The examples describe preparation of novel cathode powders based on nano-composite mixtures of ceramic electrolyte material, yttrium-stabilized zirconia (YSZ) or gadolinium-doped ceria (GDC), and perovskite ceramic electrode materials, lanthanum strontium manganite (LSM) praseodymium strontium manganese ferrite (PSMF), lanthanum strontium ferrite (LSF), and lanthanum strontium cobalt ferrite (LSCF), and novel anode materials based on nano-composite mixtures of electrolyte material (YSZ or GDC) and nickel oxide. The example nano-composite cathode and anode powders are produced with surface areas tailored for ceramic fabrication processes (e.g., tape casting and screen printing) that are commonly used during the manufacture of planar solid oxide fuel cell elements. However, the disclosed processes and nano-composite cathode and anode materials are applicable to other combinations of ceramic electrolyte and electrode materials, for applications in solid oxide fuel cells, ceramic oxygen generation systems, gas separation systems, ceramic membrane reactors, and sensors. Further, the nano-composite electrode powders prepared as described under the examples can be tailored for use in other types of ceramic fabrication methods, including dry pressing, isostatic pressing, extrusion, injection molding, gel casting, and other methods known in the art.

The terms cathode and anode are used with reference to a SOFC to describe the electrodes of certain preferred embodiments of the invention. Those of ordinary skill in the art will recognize that electrodes of the present invention that function as a cathode or anode, respectively, of a SOFC may have a different function in a different electrochemical system. These terms are used for illustrative purposes only and not intended to limit the scope of the invention.

In addition to YSZ and GDC electrolyte materials used for preparing the example nano-composite cathode and anode materials, other suitable electrolyte materials may be used. These include other doped ceria materials (e.g., samarium-doped ceria, yttrium-doped ceria, calcium-doped ceria, barium cerate, and ceria doped with multiple dopants), barium zirconate, scandium-doped zirconia, lanthanum gallate based ceramic electrolyte materials, and bismuth oxide based electrolyte materials.

In addition to LSM, PSMF, LSF, and LSCF electrode materials used for preparing the example nano-composite cathode materials, other perovskite electrode materials may be used in the practice of the present invention. These include lanthanum calcium manganite (LCM), lanthanum calcium cobalt ferrite (LCCF), praseodymium strontium manganite (PSM), praseodymium strontium ferrite (PSF), samarium strontium cobaltite (SSC), or other perovskite electrode materials having the formula $(A_{1-X}B_X)(C_{1-Y}D_Y)O_{3-Z}$, where A is a lanthanide element (e.g., La, Pr, Sm, Nd, Gd, Y, etc.), B is an alkaline earth element (e.g., Ca, Sr, or Ba), and C and D are transition elements (e.g., Mn, Fe, Co, Ni, or Ti). Other electrically conducting ceramic electrode materials, not mentioned above, also can be used to prepare nano-composite cathode material using the methods disclosed herein.

In addition to nickel oxide used for preparing the example nano-composite anode materials, other potential metals and/or metal oxide precursors could be used. For nickel-based anodes, potential alternatives to nickel oxide precursors include nickel carbonate, nickel nitrate, and nickel hydroxide, among others. For certain applications, for example, where direct utilization of hydrocarbons is the preferred SOFC operational mode, it might be desired to utilize copper in the anode materials prepared by the subject processes; potential precursors for copper metal may include copper oxide, copper carbonate, and copper nitrate, among others. In some instances, improved anode performance may be obtained when multiple metals are incorporated into the anode. In such cases, it would be beneficial to first prepare a solid solution of the metal hydroxides (by chemical coprecipitation) or solid solution oxides (by coprecipitation followed by calcination) and then to utilize these solid solution precursors within the processes of this invention. In yet other applications, it may be desired to incorporate a small amount of a precious metal (e.g., palladium, ruthenium, platinum, or rhodium) into the cermet anode. In these cases, the precious metals would be incorporated as precious metal salts at the time when the nanoscale electrolyte material is milled with the primary metal precursor powder.

However, as detailed herein, appropriate adjustments to the various compositions, synthesis conditions, processing methods can result in nano-composite powder mixtures that will have utility for solid oxide fuel cells, and other electrochemical device applications.

EXAMPLE 1

This example described the preparation of a nanoscale yttrium-doped zirconia (YSZ) material that was used in the preparation of nano-composite anode formulations described in Examples 5-7 and 9-12. Multiple batches of nanoscale YSZ material were prepared to prepare these example anode formulations.

An aqueous suspension of nanoscale, crystalline YSZ (8 mol % $Y_2O_3$) powder was prepared by coprecipitation to form a hydrous zirconium-yttrium hydroxide precursor, followed by hydrothermal crystallization in an autoclave. A sample of this aqueous YSZ suspension was dried, and its measured surface area was 125 $m^2$/gram. The product YSZ suspension was subjected to cross-flow filtration to remove residual salts and to exchange the water solvent in the slurry with isopropyl alcohol. This IPA slurry of nanoscale YSZ powder was used to make nano-composite anode formulations, as described under Examples 5-6. Some of this IPA suspension was dried and the resulting nanoscale YSZ powder was sieved through a 200-mesh screen and used for the preparation of nano-composite anode formulations described in Examples 9-12.

IPA suspensions of YSZ powder were prepared as described above, and then dried to a powder, sieved through a 200-mesh screen and calcined at 750° C. for one hour. The calcination treatment reduced the surface area to 75 $m^2$/gram. An aqueous slurry was prepared by adding 750 grams of calcined YSZ powder to 300 grams of distilled water, the pH of this slurry was increased to 12.1 by adding 44.75 grams of 25% tetramethyl ammonium hydroxide, and 7.5 grams of citric acid was added as a surfactant. The YSZ slurry then was placed in an attrition mill with about 2500 grams of 3-mm diameter YSZ grinding media, and the mixture was attrition milled for eight hours, dried and sieved through a 100-mesh screen. This calcined and attrition-milled YSZ powder was used to make nano-composite anode formulations, as described under Example 7.

EXAMPLE 2

This example describes the processing of nickel oxide powder that was used for the preparation of nano-composite anode formulations described in Examples 6, 7, and 13. 1000 grams of as-received nickel oxide powder (GFS, Lot #L402162) was attrition milled for eight with about 2500 grams of 3-mm diameter YSZ media and about 150 grams of isopropyl alcohol. The attrition-milled slurry was collected, and additional IPA was added to reduce the solids content to about 50 wt %. A sample of this IPA slurry was dried, and the surface area of the milled NiO powder was 2.7 $m^2$/gram (compared to 0.5 $m^2$/gram for the NiO powder prior to milling).

EXAMPLE 3

This example describes the preparation of nanoscale gadolinium-doped ceria (GDC) material that was used for the preparation of nano-composite anode formulations described in Examples 13 and 14, and nano-composite cathode formulations of Examples 15-24. Multiple batches of nanoscale GDC material were prepared to prepare these example anode and cathode formulations. An aqueous suspension of nanoscale, crystalline GDC (10 mol % $Gd_2O_3$) powder was prepared by coprecipitation to form a hydrous cerium-gadolinium hydroxide precursor, followed by hydrothermal crystallization in an autoclave. The product GDC suspension was washed in water to remove residual salts, and then in isopropyl alcohol to exchange the solvent. The washing and solvent exchange was achieved by repeating the steps of centrifugation, decantation, solvent addition, and high-shear mixing. Two wash cycles were performed with water being added after decantation, and three cycles were performed with isopropyl alcohol being added after decantation. A sample of this suspension was dried, and the surface area of the resulting GDC powder was 162 $m^2$/gram. This IPA slurry was used for nano-composite anode formulations described in Examples 13 and 14.

An aqueous suspension of nanoscale, crystalline (GDC 10 mol % $Gd_2O_3$) powder was prepared by coprecipitation to form a hydrous zirconium-yttrium hydroxide precursor, followed by hydrothermal crystallization in an autoclave. The product GDC suspension was subjected to cross-flow filtration to remove residual salts and to exchange the water solvent in the slurry with isopropyl alcohol. This IPA slurry was then dried to produce a nanoscale GDC powder with a surface area of 150 $m^2$/gram, and then used to make nano-composite cathode formulations, as described under Examples 15, and 20-25.

A portion of the nanoscale GDC powder was calcined at 793° C. for one hour, attrition milled in ethanol for four hours, and then dried and sieved through a 200-mesh screen. The surface area of this calcined and attrition-milled GDC powder was 25 $m^2$/gram, and this powder was used to make nano-composite cathode formulations, as described under Example 16-17.

Another portion of the nanoscale GDC powder was calcined at 800° C. for 4 hours, attrition milled in isopropyl alcohol with zirconia grinding media (3-mm cylinders) for 6 hours, and then dried and sieved through a 200-mesh screen. The surface area of this coarse GDC powder was 36.2 m²/gram, and this powder was used to make coarse-composite electrode powders and coatings, as described in Comparative Example 19.

Ceramic samples of the GDC electrolyte material were made from the above-described GDC powder that was calcined at 793° C., attrition milled, dried and sieved. Two sizes of ceramic disc samples were made by isostatically pressing discs (both 3-cm and 5-cm in diameter), and sintering the discs at a temperature of 1275° C. for two hours, which provide a density of greater than 95 percent of theoretical. Bar-shaped specimens of about 4-cm in length and 0.25 cm² in cross-sectional area were cut from the large GDC discs, and these bars were used for ionic conductivity measurements. Electrical contacts were made and silver lead wires were attached to the GDC bars using platinum ink. Electrical resistance measurements were made at different temperatures between 400 to 800° C. using a digital voltmeter; a constant current of a few milliamps was applied through lead wires attached to the end of the bars, and the resulting voltage was measured at lead wires in the interior of the bars. The ionic conductivity was calculated from the measured resistance and the geometry of the test specimens. These conductivity data are presented in FIG. 1. The measured ionic conductivity is among the highest reported in the literature for GDC ceramics of the same composition, which confirms that the GDC material has high quality. A number of GDC electrolyte discs were made with dimensions of about 2-cm diameter. Both faces of these discs were machined (lapped) so that the thicknesses were exactly 300 microns. These discs were used as substrates for screen printing of single-phase electrode coatings (Comparative Example 18), coarse-composite coatings (Comparative Example 19), nano-composite electrode coatings (Examples 20-25), and subsequent electrical measurements described in Example 26.

EXAMPLE 4

This example describes the preparation of praseodymium strontium manganese ferrite (PSMF), lanthanum strontium manganite (LSM), lanthanum strontium cobalt ferrite (LSCF) and lanthanum strontium ferrite (LSF) powders that were used to make nano-composite cathode formulations described in Examples 14-22. PSMF powder (Example 4A) of the composition $(Pr_{0.80}Sr_{0.20})(Mn_{0.50}Fe_{0.50})O_3$ was prepared as follows. Stoichiometric amounts of praseodymium carbonate, strontium carbonate, manganese carbonate and iron oxide were ball milled with zirconia grinding media isopropyl alcohol for 24 hours. The ball-milled slurry was dried and sieved through a 60-mesh screen, and then calcined at 1200° C. for four hours. The calcined PSMF powder was then attrition milled in isopropyl alcohol for eight hours with 3-mm diameter zirconia grinding media, and then dried and sieved through a 100-mesh screen. The surface area of this PSMF powder was 5.9 m²/gram. This PSMF powder was used to make nano-composite electrode powders, as described in Examples 15 and 16.

LSM powder of the composition $(La_{0.85}Sr_{0.15})MnO_3$ (Example 4B) was prepared as follows. Stoichiometric amounts of lanthanum carbonate, strontium carbonate and manganese carbonate were ball milled with zirconia grinding media isopropyl alcohol for 24 hours. The ball milled slurry was dried and sieved through a 60-mesh screen, and then calcined at 1000 C for eight hours. The calcined LSM powder was then attrition milled in isopropyl alcohol for eight hours with 3-mm diameter zirconia grinding media, and then dried and sieved through a 100-mesh screen. The surface area of this LSM powder was 9.5 m²/gram. This LSM powder was used to make nano-composite electrode powder, as described in Example 17.

LSF-20 powder of the composition $(La_{0.80}Sr_{0.20})FeO_3$ (Example 4C) and LSF-40 powder of the composition $(La_{0.60}Sr_{0.40})FeO_3$ (Example 4D) were prepared as follows. Stoichiometric amounts of lanthanum carbonate, strontium carbonate and cobalt carbonate and iron oxide were attrition milled with zirconia grinding media (3-mm diameter) and isopropyl alcohol for 6 hours. The attrition-milled slurry was dried and sieved through a 60-mesh screen, and then calcined at 700° C. for eight hours. The calcined LSF powders were then attrition milled in isopropyl alcohol for 6 hours with 3-mm diameter zirconia grinding media, and then dried and sieved through a 100-mesh screen. The powder was then re-calcined at 950° C. for 8 hours, and attrition milled again for 6 hours to produced a fine LSF powder. The surface areas of the LSF-20 and LSF-40 powders were 9.52 and 13.9 m²/gram, respectively. The LSF-20 powder was used to prepare nano-composite electrode powders and coatings, as described in Example 23. The LSF-40 powder was used for the preparation of single-phase electrode coatings as described in Comparative Example 18, coarse-composite electrode powders and coatings as described in Comparative Example 19, and nano-composite electrode powders and coatings as described in Examples 21-23.

LSCF powder of the composition $(La_{0.60}Sr_{0.40})(Co_{0.20}Fe_{0.80})O_3$ (Example 4E) was prepared as follows. Stoichiometric amounts of lanthanum carbonate, strontium carbonate and cobalt carbonate and iron oxide were attrition milled with zirconia grinding media (3-mm diameter) and isopropyl alcohol for 6 hours. The attrition-milled slurry was dried and sieved through a 60-mesh screen, and then calcined at 900° C. for eight hours. The calcined LSCF powder was then attrition milled in isopropyl alcohol for 6 hours with 3-mm diameter zirconia grinding media, and then dried and sieved through a 100-mesh screen. The surface area of this LSCF powder was 8.9 m²/gram. This LSCF powder was used to make single-phase electrode coatings as described in Comparative Example 18, and nano-composite electrode powders and coatings as described in Examples 24-25.

Figure 2:
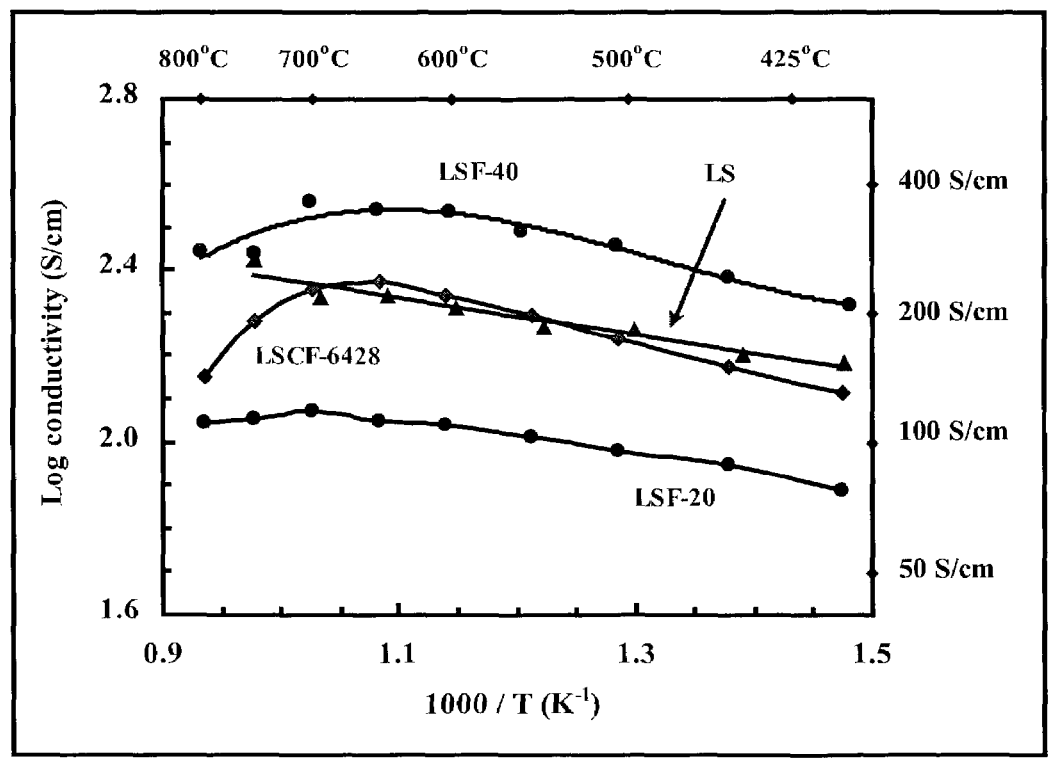
FIG. 2 is an Arrhenius plot showing temperature dependence of ionic conductivity of perovskite electrode materials prepared as described in Example 4.

Ceramic specimens of the LSM, LSF-20, LSF-40 and LSCF perovskite electrode compositions prepared as described above were made by isostatically pressing discs (5-cm in diameter) from the electrode powders, sintering the samples at temperatures of 1200 to 1400° C., to achieve densities greater than about 90 percent of theoretical. Bar-shaped specimens, about 4-cm in length and 0.25 cm² in cross-sectional area, were cut from the discs, and these bars were used for electrical conductivity measurements. Electrical contacts were made and silver lead wires were attached to the bars using platinum ink. Electrical resistance measurements were made at different temperatures between 400 to 800° C. using a digital voltmeter; a constant current of a few milliamps was applied through lead wires attached to the end of the bars, and the resulting voltage was measured at lead wires in the interior of the bars. The ionic conductivity was calculated from the measured resistance and the geometry of the test specimens. These conductivity data for the perovskite electrode materials are presented in FIG. 2. The measured electrical conductivity for each of these materials is consistent with that reported in the literature for similar compositions, which confirms that these perovskite electrode materials were prepared with high quality.

EXAMPLES 5, 6, and 7

Examples 5, 6, and 7 describe the preparation of a nano-composite anode formulation based on a mixture of nickel oxide (NiO) and yttrium-stabilized zirconia (corresponding to a nickel metal content of 43 volume percent after reduction of NiO to Ni metal), with controlled surface areas.

EXAMPLE 5

282.5 grams of the IPA slurry from Example 1 (containing 99.5 grams of nanoscale YSZ powder), 144.14 grams of as-received nickel oxide powder (GFS, Lot #L402162), and about 50 ml of additional isopropyl alcohol was placed in an attrition mill with about 2500 grams of 3-mm diameter zirconia grinding media. This slurry was attrition milled for eight hours and then dried and sieved through a 200-mesh screen. Powder samples (2-3 grams) were then calcined at various temperatures and surface areas were measured. Data for surface area versus calcination temperature are provided in Table 1. Based on these data, 100 grams of this mixed powder was calcined at 800° C. for one hour, and 135 grams of powder was calcined at 925° C. for one hour, resulting in surface areas of 19.0 and 11.1 $m^2$/gram, respectively.

TABLE 1

Surface areas (in units of $m^2$/gram) for calcined nano-composite electrode powders calcined at different temperatures.

| T (° C.) | Ex. 5 | Ex. 6 | Ex. 7 | Ex. 13 | Ex. 14 | Ex. 15 |
|---|---|---|---|---|---|---|
| 25 | — | 49.1 | 31.6 | 64.0 | — | 65.3 |
| 600 | — | — | — | — | — | 27.8 |
| 700 | — | — | 27.2 | 29.5 | — | 18.8 |
| 750 | 24.3 | 26.4 | — | 19.5 | 24.2 | — |
| 800 | 23.0 | 21.1 | 19.5 | 16.1 | 17.19 | — |
| 850 | — | — | — | — | — | 8.0 |
| 900 | 13.8 | 13.9 | 12.6 | 8.6 | — | — |
| 925 | 8.5 | 9.8 | 12.0 | — | — | 5.0 |
| 950 | 7.8 | 9.1 | 6.5 | — | 11.5 | — |
| 1000 | — | 7.1 | 5.3 | 5.1 | — | — |

EXAMPLE 6

Figure 3:
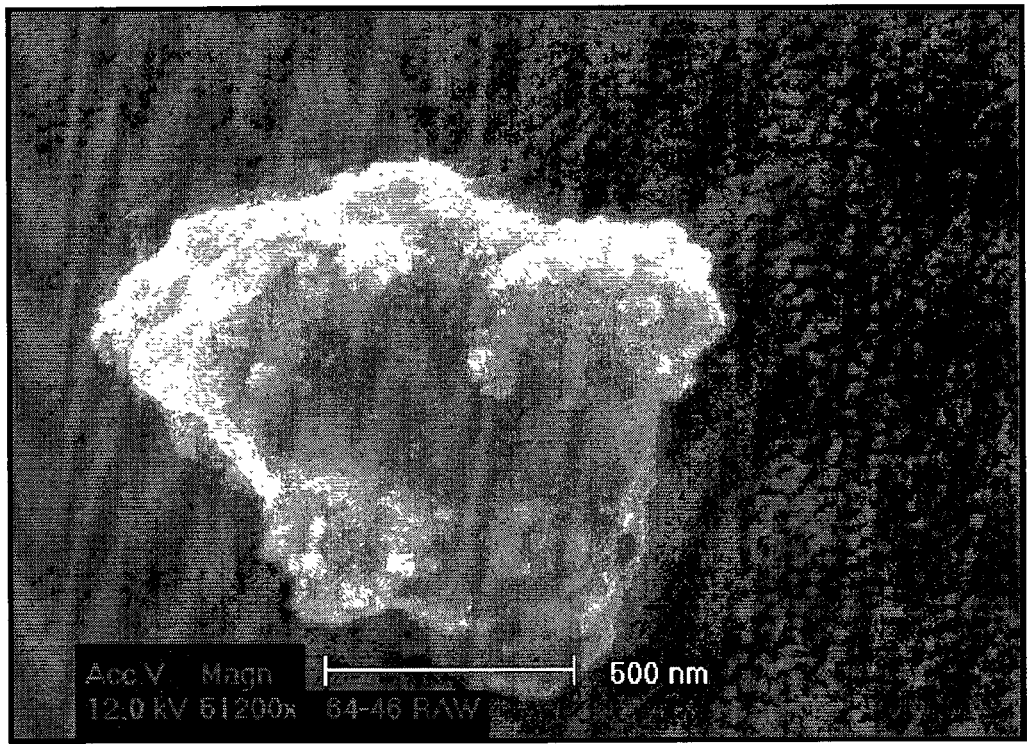
FIG. 3 is a scanning electron microscope (SEM) micrograph of as-produced nano-composite NiO/YSZ anode powder prepared as described under Example 6.
Figure 4:
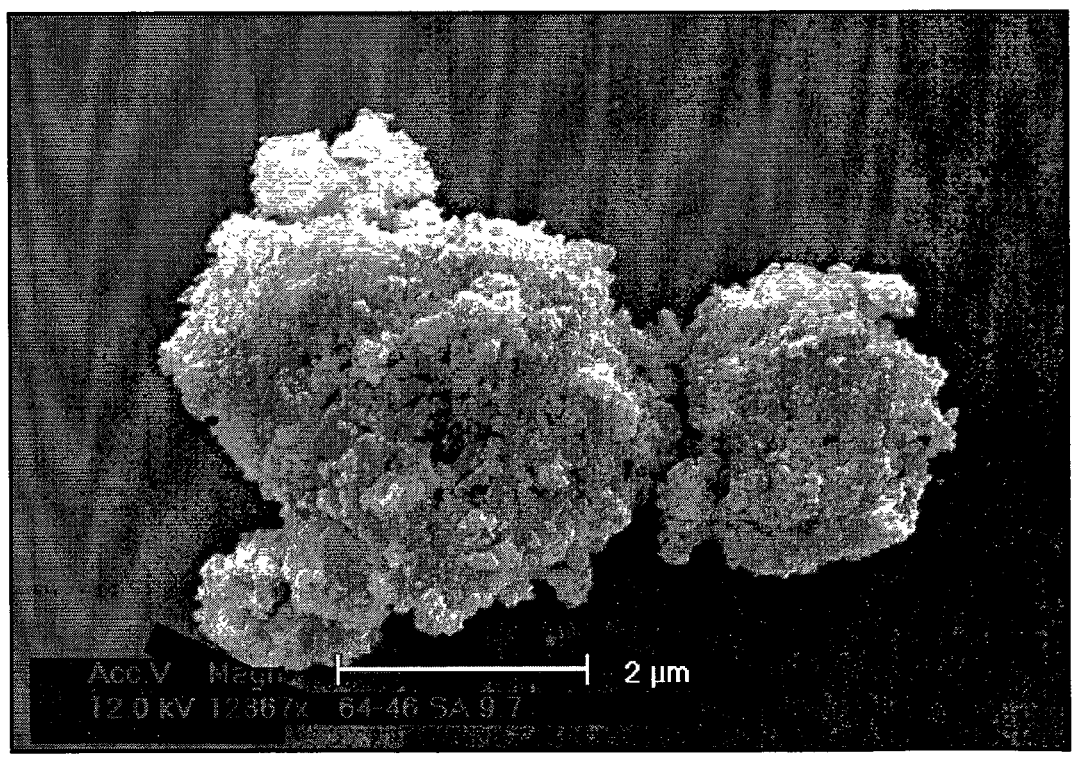
FIG. 4 is an SEM micrograph of nano-composite NiO/YSZ anode powder prepared as described under Example 6 and calcined at 925° C. for one hour.

2090 grams of IPA slurry of nanoscale YSZ powder (from Example 1, containing 204.25 grams of YSZ) and 583 grams of the attrition-milled IPA slurry (from Example 2, containing 295.75 grams of NiO) was placed in a four-liter nalgene jar with 6300 grams of zirconia grinding media (5-mm and 10-mm cylinders). This combined slurry was ball milled for 24 hours, dried, and then sieved through a 200-mesh screen. The surface area of this nano-composite anode powder was 49.1 $m^2$/gram. Powder samples (2-3 grams) were then calcined at various temperatures and surface areas were measured. Data for surface area versus calcination temperature are provided in Table 1. Based on these data, 100 grams of this mixed powder was calcined at 800° C. for one hour, and 200 grams of powder was calcined at 925° C. for one hour, resulting in surface areas of 19.9 and 9.8 $m^2$/gram, respectively. SEM micrographs showing the morphology of as-dried and calcined nano-composite powders of this example are shown in FIGS. 3 and 4. These micrographs show that the nanoscale YSZ material has coated the surfaces of the coarser nickel oxide particles, and that this coated-powder morphology is retained as the materials is calcined to 925° C.

EXAMPLE 7

585.3 grams of the attrition-milled IPA slurry (from Example 2, containing 295.75 grams of NiO) and 204.25 grams of calcined and attrition-milled YSZ powder (from Example 1) was placed in a one-liter nalgene jar with 2100 grams of zirconia grinding media (5-mm and 10-cm cylinders). This powder mixture was ball milled for 24 hours, dried, and then sieved through a 200-mesh screen. The surface area of this nano-composite anode powder was 31.56 $m^2$/gram. Powder samples (2-3 grams) were then calcined at various temperatures and surface areas were measured. Data for surface area versus calcination temperature are provided in Table 1. Based on these data, 100 grams of this nano-composite anode powder was calcined at 750° C. for one hour, and 200 grams of powder was calcined at 925° C. for one hour, resulting in surface areas of 20.0 and 8.9 $m^2$/gram, respectively.

COMPARATIVE EXAMPLE 8

Figure 5:
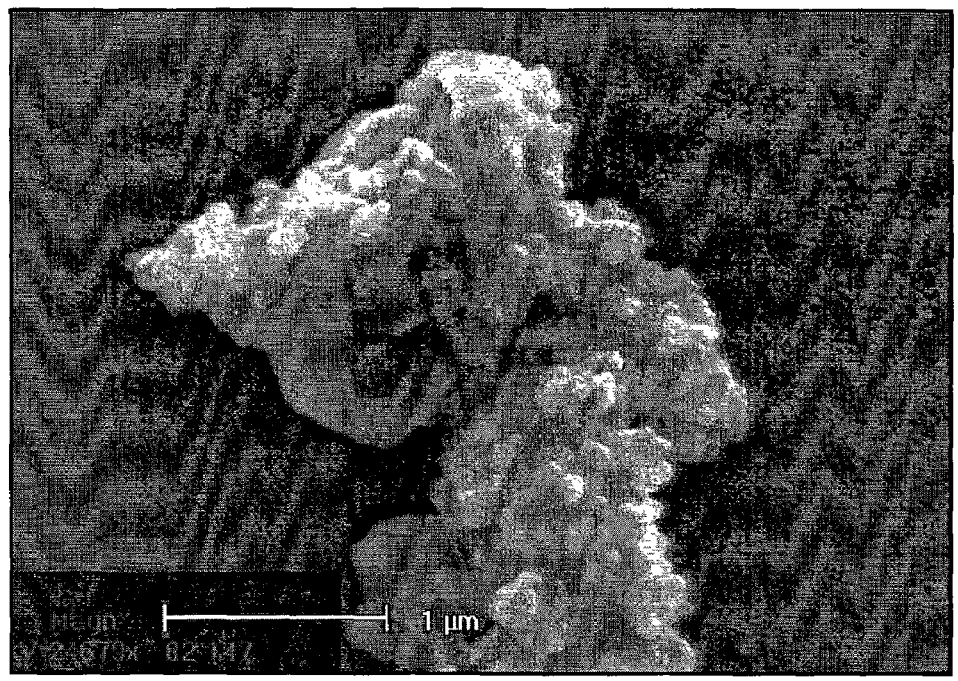
FIG. 5 is an SEM micrograph of composite NiO/YSZ anode powder prepared as described under Comparative Example 8.

This example illustrates the conventional approach to making anode (NiO/YSZ) formulation, which involves ball milling of relatively coarse YSZ and NiO raw material powders. The anode formulation prepared was batched to have a composition corresponding to 59.14 weight percent nickel oxide (which corresponds to 43 volume percent nickel metal after reduction of NiO to Ni metal). 29.57 grams of nickel oxide (GFS, Lot #L402162, 0.5 $m^2$/gram) and 20.14 grams of YSZ (Tosoh, Lot # 280965P, 10.7 $m^2$/gram) were ball milled with zirconia grinding media isopropyl alcohol for 21 hours. The ball-milled slurry was dried and sieved through a 200-mesh screen. This anode mixture had a surface area of powder was 6.60 $m^2$/gram. An SEM micrograph of this powder (shown in FIG. 5) shows that two distinct phases are evident, including a coarse nickel oxide particle and agglomerates of fine-scale YSZ powder. A very poor distribution of NiO and YSZ phases is evident, compared to the SEM micrographs of nano-composite anode powder of Example 6 that were presented in FIGS. 3 and 4.

EXAMPLE 9

Figure 6:
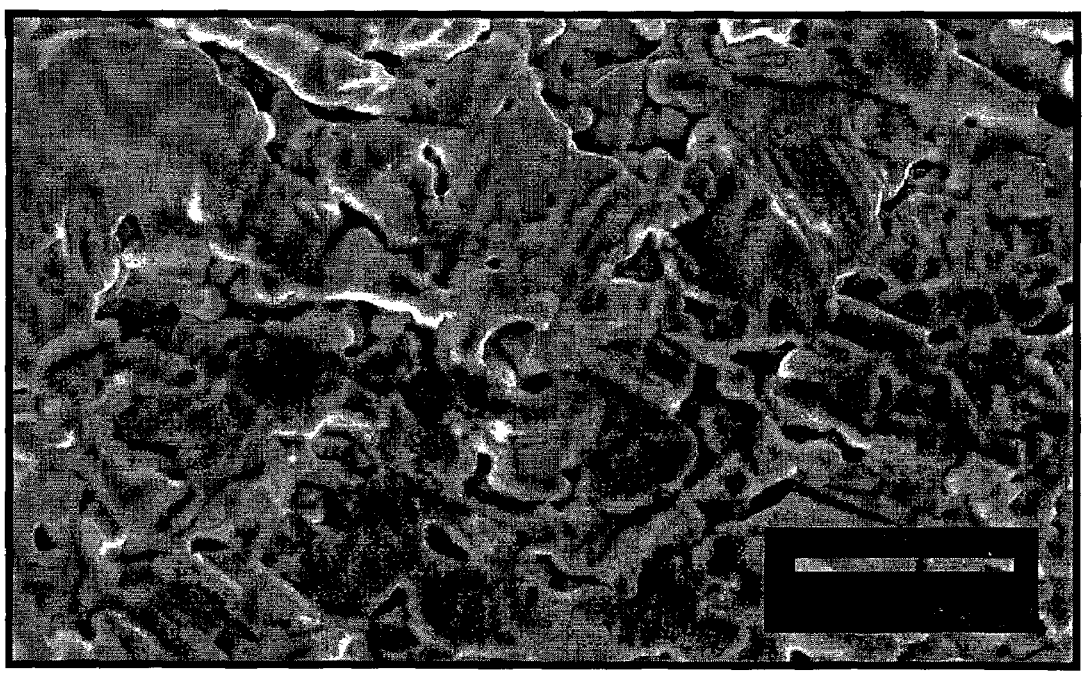
FIG. 6 is an SEM micrograph of nanoscale sintered composite NiO/YSZ anode prepared as described under Example 9.
Figure 7:
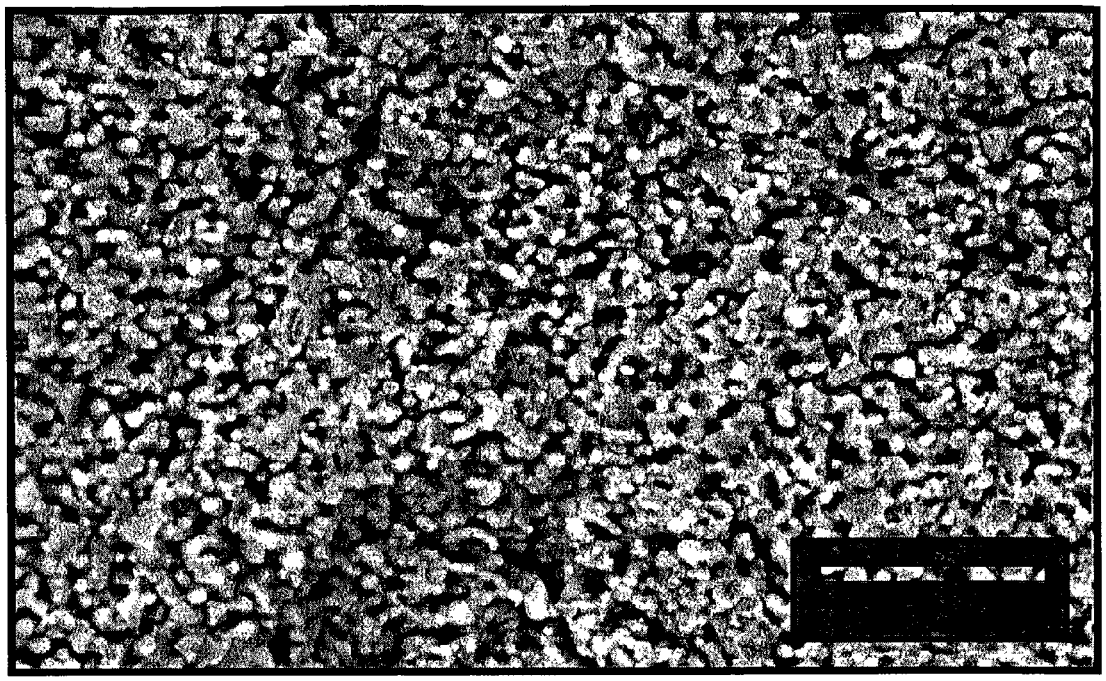
FIG. 7 is an SEM micrograph of sintered composite NiO/YSZ anode prepared as described under Example 9, using powder from Comparative Example 8.

111.01 grams of nanoscale YSZ, with a surface area of 135.33 $m^2$/gram, was dry milled with 188.99 g of NiO (Novamet High Purity Green NiO-Grade F) to achieve a homogeneous mixture with a target Ni metal content of 47 volume percent. The resulting mixture was then placed in a 1 liter attrition mill container with approximately 2500 grams of 3-mm diameter ceria-stabilized zirconia media and 200 ml of isopropyl alcohol. The material was milled for 6 hours to achieve intimate mixing. The powder was removed and dried at room temperature, then sieved through 100 mesh prior to calcination. The surface area of the as-milled powder was 41.75 $m^2$/gram. The surface area was tailored for tape casting by calcining the as-milled powder for 4 hours at 900° C. to achieve a surface area of 9.5 $m^2$/gram. Using a commercial binder system, a slurry was prepared containing 13.3 volume percent NiO-YSZ composite powder, and 5.7 volume percent maltodextrin (Pure Dent B-850, Grain Processing Corporation) to produce a ceramic body with interconnected porosity upon casting and sintering. The tape was slowly heated to 600° C. to remove binder and then sintered at 1275° C. for one hour to densify the material. The resulting microstructure is shown in FIG. 6. A microstructure of a tape prepared using material synthesized by the process described in Comparative Example 8 is shown in FIG. 7. This material was sintered at 1400° C. for 1 hour to achieve a similar sintered density (59% $\rho_{th}$). The difference in relative grain sizes of the nickel and YSZ phases is clearly evident from the micrographs, and improved anode performance would be expected for the finer-scale microstructure achieved using the nano-composite approach of this example. The difference in sintering performance can be directly attributed to the surface area of the nanoscale material in relation to the comparative material. This composite powder is also suitable for the development of screen printing inks.

EXAMPLES 10, 11 and 12

Example 10 details the synthesis of a nanoscale precursor powder by an acid-base precipitation. This material is further processed to make YSZ-NiO composite powders in Examples 11 and 12.

EXAMPLE 10

18.73 grams of nanocrystalline YSZ powder, with a surface area of 135.33 $m^2$/gram, was dispersed in water and pH adjusted to 3 using nitric acid. To this suspension, 125.2 grams of nickel nitrate was added, to produce 47 volume percent nickel upon reduction of the resulting powder. The nitrate/oxide suspension was titrated into a 2 molal solution of tetramethylammonium hydroxide; the final pH of the reaction product was 13.9. The resulting precipitate, comprised of nano-crystalline YSZ coated with an amorphous nickel hydroxide phase, was segregated from the supernatant by centrifuging the suspension at 3000 RPM for 15 minutes. The resulting cakes were divided and processed as described in Examples 11 and 12.

EXAMPLE 11

Figure 8:
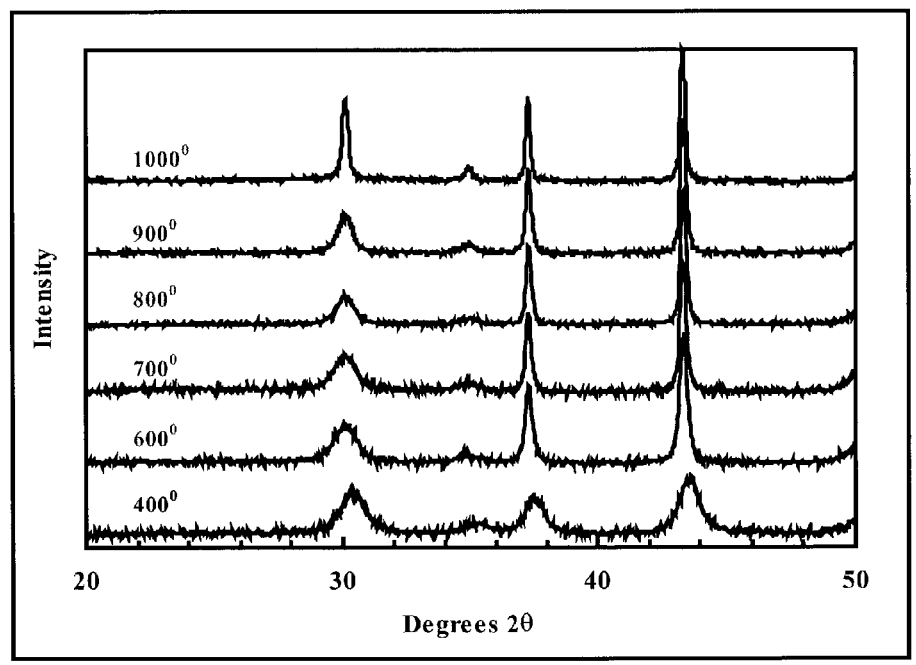
FIG. 8 is an X-ray diffraction (XRD) pattern from composite NiO/YSZ anode powder prepared as described under Example 11.

Material from Example 10 was redispersed in 1000 ml of isopropyl alcohol by shear mixing at 2000 RPM for five minutes. The suspension was then centrifuged again and the supernatant discarded. The process was repeated a second time, to complete the removal of excess salts and water. After the third centrifugation step, the product was dried in a convection oven at 60° C. for 16 hours, then ground and sieved through 200 mesh prior to calcination. The powder was calcined at 400-1000° C. to convert the amorphous nickel hydroxide into nickel oxide, and to remove any residual organic groups. X-ray diffraction was performed to ascertain the crystal structure of the materials; the resulting patterns is shown in FIG. 8. The surface area of the powder after calcination at 400° C. was 59.05 $m^2$/gram. Further modifications to surface area were made by increasing the calcination temperature; these data are recorded in Table 2.

EXAMPLE 12

Material from Example 10 was redispersed in 1000 ml of an aqueous solution of tetramethyl ammonium hydroxide (pH-12) by shear mixing at 2000 RPM for five minutes. The suspension was then centrifuged again and the supernatant discarded. The process was repeated a second time, to complete the removal of excess salts. After the third centrifugation step, the product was redispersed a final time in 1 L of water and placed in a hydrothermal reactor for 1 hour at 240° C. The crystallization reaction took place under autogeneous pressure and continuous agitation. The resulting product separated by centrifugation and dried in a convection oven at 100° C. for 16 hours. The resulting powder was sieved through 200 mesh and evaluated by XRD and surface area analysis. X-ray diffraction confirmed that crystalline nickel hydroxide formed during the hydrothermal reaction, which was converted to nickel oxide as the material was calcined at higher temperatures.

EXAMPLES 13 and 14

Examples 13 and 14 describe the preparation of a nano-composite anode formulation based on a mixture of nickel oxide (NiO) and gadolinium-doped ceria (corresponding to a nickel metal content of 43 volume percent after reduction of NiO to Ni metal), with controlled surface areas.

EXAMPLE 13

1357 grams of an IPA slurry of nanoscale GDC powder (from Example 3, containing 228.65 grams of GDC) and 534 grams of the attrition-milled IPA slurry (from Example 2, containing 271.35 grams of NiO) was placed in a four-liter nalgene jar with 6300 grams of zirconia grinding media (0.25-inch and 0.5-inch cylinders). This combined slurry was ball milled for 24 hours, dried, and then sieved through a 200-mesh screen. The surface area of this nano-composite anode powder was 64.05 $m^2$/gram. Powder samples (2-3 grams) were then calcined at various temperatures and surface areas were measured. Data for surface area versus calcination temperature are provided in Table 1. Based on these data, 100 grams of this nano-composite anode powder was calcined at 750° C. for one hour, resulting in a surface area of 22.4 $m^2$/gram.

TABLE 2

Surface areas (in units of $m^2$/gram) for calcined nano-composite electrode powders calcined at different temperatures.

| Temp (° C.) | 11 | 13 | 15 | 16 | 17 | 20 | 21 | 22 | 23 | 24 | 25 |
|---|---|---|---|---|---|---|---|---|---|---|---|
| 25 | 59.0 | — | 65.3 | 18.1 | 18.6 | 52.9 | 76.8 | 97.3 | — | 67.6 | 120.3 |
| 600 | 45.2 | — | 27.8 | — | — | — | — | — | — | — | — |
| 700 | 37.6 | — | 18.8 | — | — | — | — | — | — | — | — |
| 750 | — | 22.4 | — | — | — | — | — | — | — | — | — |
| 800 | 26.9 | 17.2 | — | — | — | — | — | — | — | — | — |
| 850 | — | — | 8.0 | — | — | 8.6 | — | — | 9.3 | 10.3 | — |
| 900 | 22.9 | — | — | — | — | 6.6 | 7.4 | 7.7 | 5.6 | 6.9 | 7.8 |
| 925 | — | — | 5.0 | — | — | — | — | — | — | — | — |
| 950 | — | 11.5 | — | — | — | 7.2 | 7.1 | 6.4 | 4.6 | 6.7 | 6.7 |
| 1000 | — | — | — | — | — | 5.1 | 5.0 | 4.7 | 3.6 | 4.8 | 4.6 |
| 1050 | — | — | — | — | — | — | 4.3 | 3.8 | — | — | 3.4 |

EXAMPLE 14

304.30 grams of the IPA slurry from Example 3 (containing 100.2 grams of nanoscale GDC powder), 118.93 grams of as-received nickel oxide powder (GFS, Lot #L402162) and about 100 ml of additional isopropyl alcohol were placed in an attrition mill with about 2500 grams of 3-mm diameter zirconia grinding media. This slurry was attrition milled for eight hours and then dried and sieved through a 200-mesh screen. The surface area of this nano-composite NiO/GDC anode powder was 80.7 m$^2$/gram. Powder samples (2-3 grams) were then calcined at various temperatures and surface areas were measured. Data for surface area versus calcination temperature are provided in Table 1. Based on these data, 100 grams of this nano-composite anode powder was calcined at 750° C. for one hour, resulting in a surface area of 24.7 m$^2$/gram.

EXAMPLES 15-22

Examples 15-22 describe the preparation of a nano-composite cathode formulations based on a mixtures of perovskite electrode materials (PSMF, LSM, LSCF, and LSF) and gadolinium-doped ceria (corresponding to a GDC content of 30 or 40 volume percent), with surface areas 5-20 m$^2$/gram (which are suitable for screen printing).

EXAMPLE 15

287.6 grams of PSMF powder (from Example 4) and 212.4 grams of nanoscale GDC powder (from Example 3) were placed in an attrition mill with about 2500 grams of 3-mm diameter zirconia grinding media and about 200 ml of isopropyl alcohol. This slurry was attrition milled for eight hours and then dried and sieved through a 200-mesh screen. The surface area of this nano-composite cathode powder was 18.1 m$^2$/gram. Powder samples (2-3 grams) were then calcined at various temperatures and surface areas were measured. Data for surface area versus calcination temperature are provided in Table 1. Based on these data, 100 grams of this nano-composite cathode powder was calcined at 625° C. for one hour, resulting in a surface area of 28.1 m$^2$/gram.

EXAMPLE 16

287.6 grams of PSMF powder (from Example 4A) and 212.4 grams of calcined and attrition-milled GDC powder (from Example 3) were placed in an attrition mill with about 2500 grams of 3-mm diameter zirconia grinding media and about 200 ml of isopropyl alcohol. This slurry was attrition milled for eight hours and then dried and sieved through a 200-mesh screen. The surface area of this nano-composite cathode powder was 18.1 m$^2$/gram.

EXAMPLE 17

215.87 grams of LSM powder (from Example 4B) and 155.25 grams of calcined and attrition-milled GDC powder (from Example 3) were placed in an attrition mill with about 2500 grams of 3-mm diameter zirconia grinding media and about 200 ml of isopropyl alcohol. This slurry was attrition milled for eight hours and then dried and sieved through a 60-mesh screen. The surface area of this nano-composite cathode powder was 18.6 m$^2$/gram.

COMPARATIVE EXAMPLE 18

Samples for electrical testing were prepared using single-phase perovskite electrode powders, including LSF-40 (Example 4D) and LSCF (Example 4E). Screen-printing inks were prepared by dispersing 7 grams of LSF-40 or LSCF powder into a commercial terpineol-based ink vehicle (Heraeus, No. V-006), using a three-roll mill. The solids content of the inks was about 25 volume percent, and the viscosity was about 19 Pa-sec at 13 s$^{-1}$. Circular patterns (1.27 cm diameter) were deposited by screen printing onto opposite faces of the 300-micron GDC discs from Example 3. The electrode-coated GDC discs were then annealed at 950° C. for 1 hours so that the electrodes adhered to the GDC discs. After annealing, thicknesses of the electrode coatings were about 50 microns for both samples. Electrical testing of these samples was performed, as described under Example 26.

COMPARATIVE EXAMPLE 19

Figure 9:
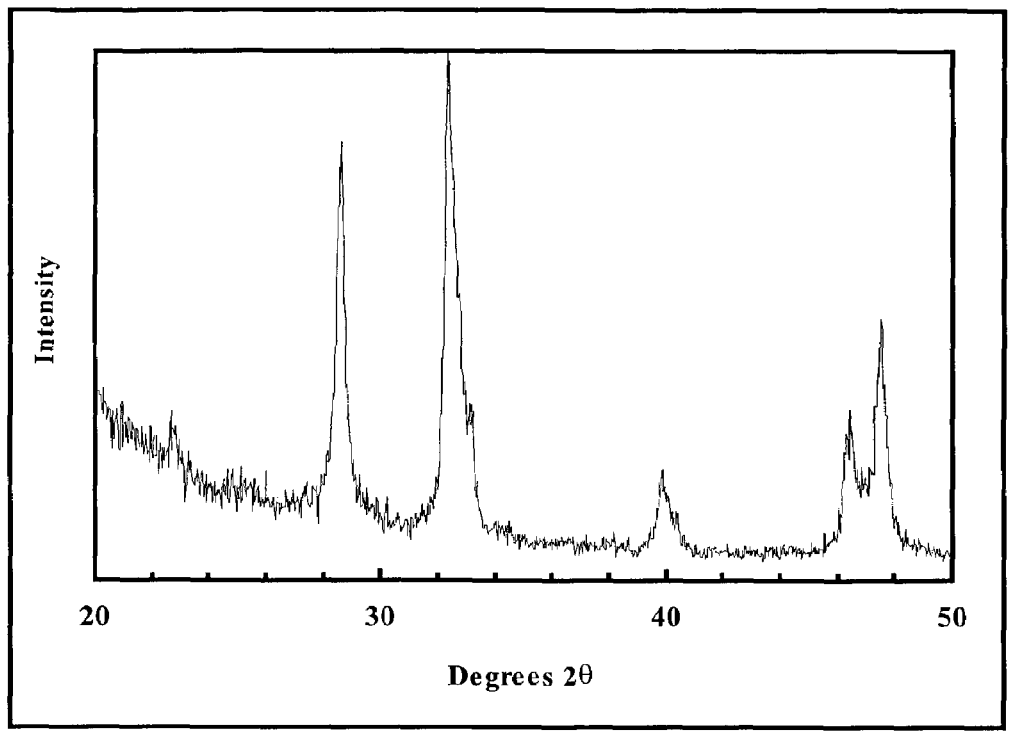
FIG. 9 is an XRD pattern from composite LSF-40/GDC-30% cathode powder prepared as described under Example 19.

90.7 grams of coarse GDC powder that was calcined at 800° C. and ball milled (from Example 3) were combined with 82.09 grams of LSF-40 powder from Example 4D to form a 40 volume percent GDC powder mixture. The powders were mixed by ball milling with zirconia grinding media and isopropyl alcohol. The ball-milled slurry was dried and sieved through a 100-mesh screen. An XRD pattern from the resulting powder is shown in FIG. 9. The mixed powder was calcined at 1000° C. to produce a composite powder with a surface area of 4.2 m$^2$/gram. A screen-printing ink was prepared by dispersing 5 grams of composite powder into a commercial terpineol-based ink vehicle (Heraeus, No. V-006) using a three-roll mill. The solids content of the inks was about 30 volume percent and the viscosity was about 20 Pa-sec at 13 s$^{-1}$. Circular patterns (1.27 cm diameter) were deposited by screen printing onto opposite faces of the 300-micron GDC discs from Example 3. The electrode-coated GDC disc was then annealed at 950° C. for 1 hours so that the electrodes adhered to the GDC discs. After annealing, thicknesses of the electrode coatings were about 50 microns. Electrical testing of this sample was performed, as described under Example 26.

EXAMPLE 20

Figure 10:
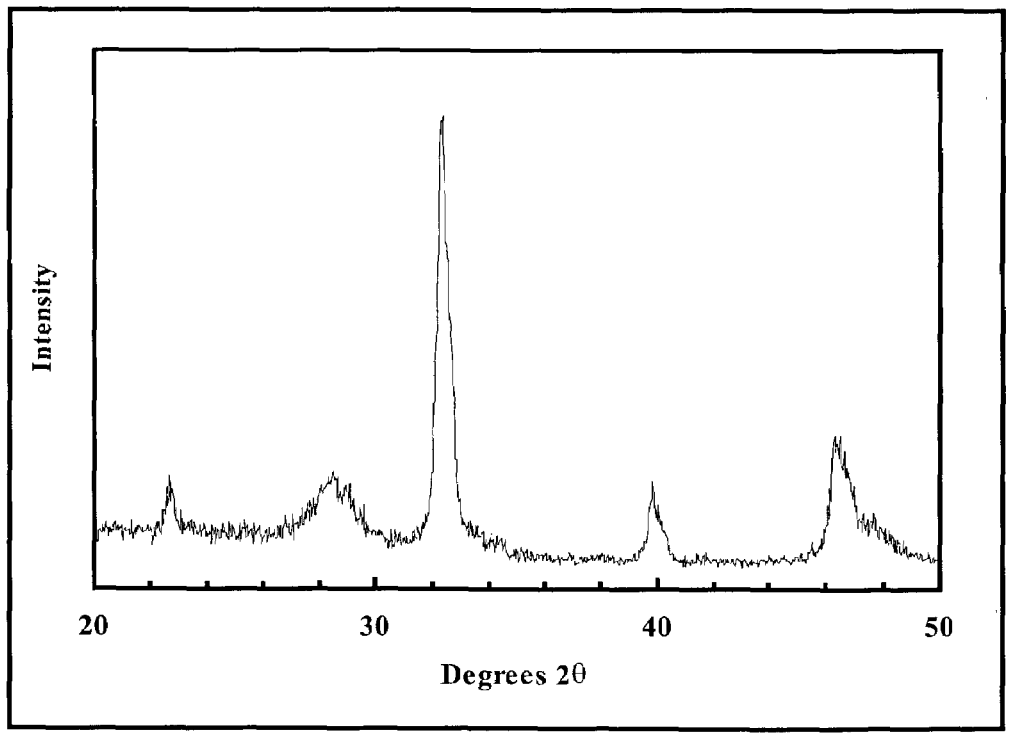
FIG. 10 is an XRD pattern from composite LSF-40/GDC-40% cathode powder prepared as described under Comparative Example 20.

204.42 grams of LSF-40 powder (from Example 4D) and 95.58 grams of nanoscale GDC powder (from Example 3) were mixed to form a 30 volume percent GDC mixture. The powder was placed in an attrition mill with about 2500 grams of 3-mm diameter zirconia grinding media and about 200 ml of isopropyl alcohol. This slurry was attrition milled for six hours and then dried and sieved through a 200-mesh screen. The surface area of this nano-composite electrode powder was 52.94 m$^2$/gram. An XRD pattern from the resulting powder is shown in FIG. 10. Powder samples (15-20 grams) were then calcined at various temperatures and surface areas were measured. Data for surface area versus calcination temperature are provided in Table 2. Screen-printing inks were prepared for nano-composite electrode powders calcined at 850, 900, 950, and 1000° C. These inks were prepared by dispersing 5 grams of composite powder into a commercial terpineol-based ink vehicle (Heraeus, No. V-006) using a three-roll mill. The solids content of the inks was about 30 volume percent and the viscosity was about 20 Pa-sec at 13 s$^{-1}$. Circular patterns (1.27 cm diameter) were deposited by screen printing onto opposite faces of the 300-micron GDC discs from Example 3. The electrode-coated GDC disc was then annealed at 950° C. for 1 hours so that the electrodes adhered to the GDC discs. After annealing, thicknesses of the electrode coatings were about 50 microns. Electrical testing of this sample was performed, as described under Example 26.

EXAMPLE 21

Figure 11:
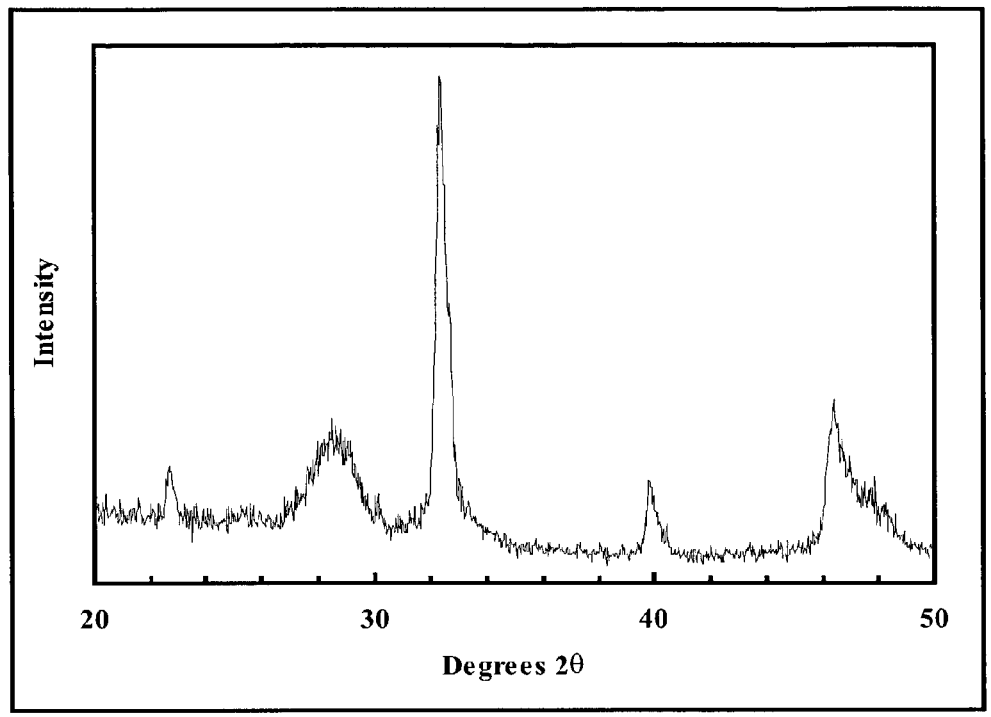
FIG. 11 is an XRD pattern from composite LSF-40/GDC-50% anode powder prepared as described under Comparative Example 21.

173.2 grams of LSF-40 powder (from Example 4D) and 127.1 grams of nanoscale GDC powder (from Example 3) were mixed to form a 40 volume percent GDC mixture. The powder was placed in an attrition mill with about 2500 grams of 3-mm diameter zirconia grinding media and about 200 ml of isopropyl alcohol. This slurry was attrition milled for six hours and then dried and sieved through a 200-mesh screen. The surface area of this nano-composite electrode powder was 76.76 m$^2$/gram. An XRD pattern from the resulting powder is shown in FIG. 11. Powder samples (15-20 grams) were then calcined at various temperatures and surface areas were measured. Data for surface area versus calcination temperature are provided in Table 2. Screen-printing inks were prepared for nano-composite electrode powders calcined at 850, 900, 950, and 1000° C. These inks were prepared by dispersing 5 grams of composite powder into a commercial terpineol-based ink vehicle (Heraeus, No. V-006) using a three-roll mill. The solids content of the inks was about 30 volume percent and the viscosity was about 20 Pa-sec at 13 s$^{-1}$. Circular patterns (1.27 cm diameter) were deposited by screen printing onto opposite faces of the 300-micron GDC discs from Example 3. The electrode-coated GDC disc was then annealed at 950° C. for 1 hours so that the electrodes adhered to the GDC discs. After annealing, thicknesses of the electrode coatings were about 50 microns. Electrical testing of this sample was performed, as described under Example 26.

EXAMPLE 22

Figure 12:
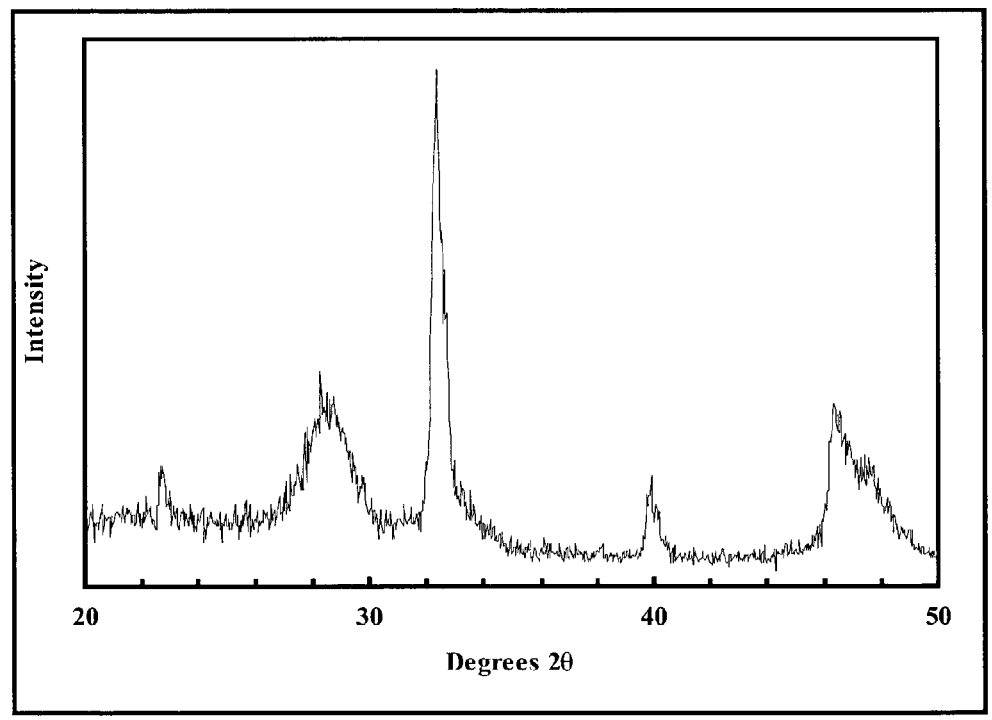
FIG. 12 is an XRD pattern from composite LSF-40/GDC-50% cathode powder prepared as described under Example 22.

144.19 grams of LSF-40 powder (from Example 4D) and 156.03 grams of nanoscale GDC powder (from Example 3) were mixed to form a 50 volume percent GDC mixture. The powder was placed in an attrition mill with about 2500 grams of 3-mm diameter zirconia grinding media and about 200 ml of isopropyl alcohol. This slurry was attrition milled for six hours and then dried and sieved through a 200-mesh screen. An XRD pattern from the resulting powder is shown in FIG. 12. The surface area of this nano-composite electrode powder was 97.29 m$^2$/gram. Powder samples (15-20 grams) were then calcined at various temperatures and surface areas were measured. Data for surface area versus calcination temperature are provided in Table 2. Screen-printing inks were prepared for nano-composite electrode powders calcined at 850, 900, 950, and 1000° C. These inks were prepared by dispersing 5 grams of composite powder into a commercial terpineol-based ink vehicle (Heraeus, No. V-006) using a three-roll mill. The solids content of the inks was about 30 volume percent and the viscosity was about 20 Pa-sec at 13 s$^{-1}$. Circular patterns (1.27 cm diameter) were deposited by screen printing onto opposite faces of the 300-micron GDC discs from Example 3. The electrode-coated GDC disc was then annealed at 950° C. for 1 hours so that the electrodes adhered to the GDC discs. After annealing, thicknesses of the electrode coatings were about 50 microns. Electrical testing of this sample was performed, as described under Example 26.

EXAMPLE 23

Figure 13:
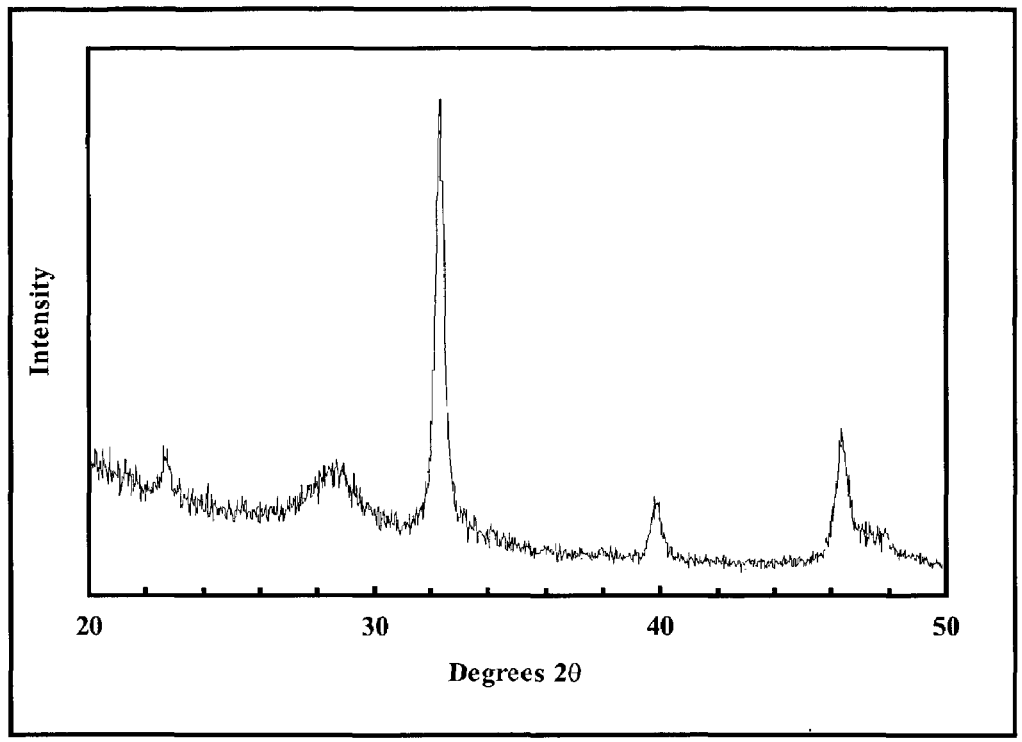
FIG. 13 is an XRD pattern from composite LSF-20/GDC-30% cathode powder prepared as described under Example 23.

204.42 grams of LSF-20 powder (from Example 4C) and 95.58 grams of nanoscale GDC powder (from Example 3) were mixed to form a 30 volume percent GDC mixture. The powder was placed in an attrition mill with about 2500 grams of 3-mm diameter zirconia grinding media and about 200 ml of isopropyl alcohol. This slurry was attrition milled for six hours and then dried and sieved through a 200-mesh screen. An XRD pattern from the resulting powder is shown in FIG. 13. Powder samples (15-20 grams) were then calcined at various temperatures and surface areas were measured. Data for surface area versus calcination temperature are provided in Table 2. Screen-printing inks were prepared for nano-composite electrode powders calcined at 850, 900, 950, and 1000° C. These inks were prepared by dispersing 5 grams of composite powder into a commercial terpineol-based ink vehicle (Heraeus, No. V-006) using a three-roll mill. The solids content of the inks was about 30 volume percent and the viscosity was about 20 Pa-sec at 13 s$^{-1}$. Circular patterns (1.27 cm diameter) were deposited by screen printing onto opposite faces of the 300-micron GDC discs from Example 3. The electrode-coated GDC disc was then annealed at 950° C. for 1 hours so that the electrodes adhered to the GDC discs. After annealing, thicknesses of the electrode coatings were about 50 microns. Electrical testing of this sample was performed, as described under Example 26.

EXAMPLE 24

Figure 14:
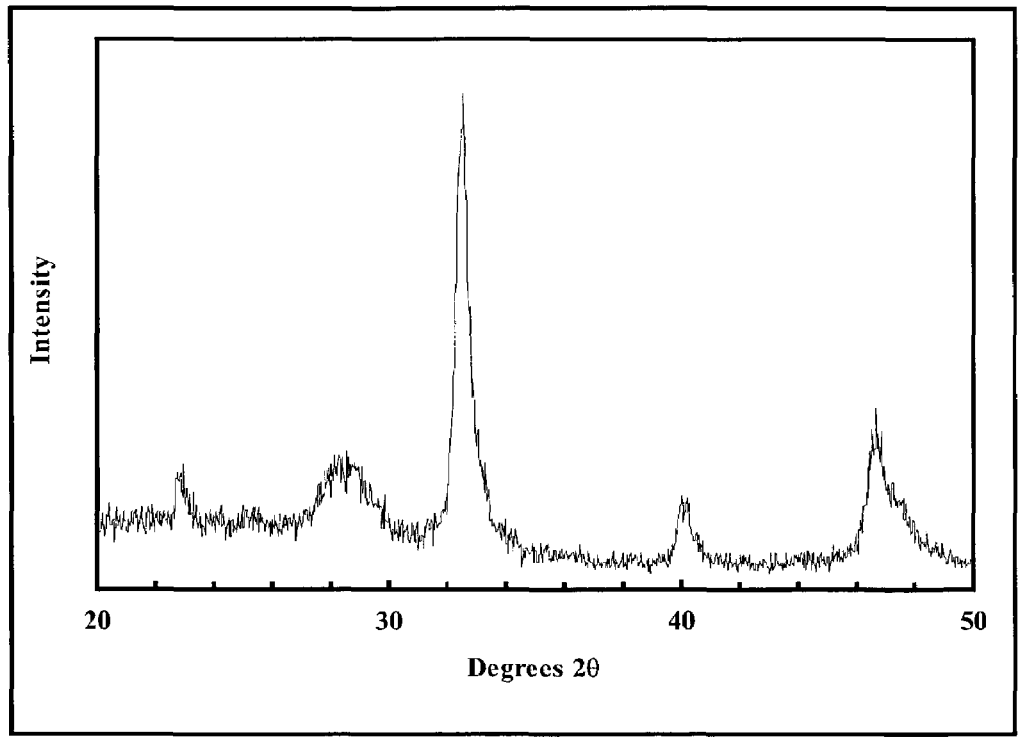
FIG. 14 is an XRD pattern from composite LSCF/GDC-30% cathode powder prepared as described under Example 24.

202.92 grams of LSCF powder (from Example 4E) and 97.08 grams of nanoscale GDC powder (from Example 3) were mixed to form a 30 volume percent GDC mixture. The powder was placed in an attrition mill with about 2500 grams of 3-mm diameter zirconia grinding media and about 200 ml of isopropyl alcohol. This slurry was attrition milled for six hours and then dried and sieved through a 200-mesh screen. An XRD pattern from the resulting powder is shown in FIG. 14. The surface area of this nano-composite cathode powder was 67.56 m$^2$/gram. Powder samples (15-20 grams) were then calcined at various temperatures and surface areas were measured. Data for surface area versus calcination temperature are provided in Table 2. Screen-printing inks were prepared for nano-composite electrode powders calcined at 850, 900, 950, and 1000° C. These inks were prepared by dispersing 5 grams of composite powder into a commercial terpineol-based ink vehicle (Heraeus, No. V-006) using a three-roll mill. The solids content of the inks was about 30 volume percent and the viscosity was about 20 Pa-sec at 13 s$^{-1}$. Circular patterns (1.27 cm diameter) were deposited by screen printing onto opposite faces of the 300-micron GDC discs from Example 3. The electrode-coated GDC disc was then annealed at 950° C. for 1 hours so that the electrodes adhered to the GDC discs. After annealing, thicknesses of the electrode coatings were about 50 microns. Electrical testing of this sample was performed, as described under Example 26.

EXAMPLE 25

141.76 grams of LSCF powder (from Example 4E) and 158.24 grams of nanoscale GDC powder (from Example 3) were mixed to form a 50 volume percent GDC mixture. The powder was placed in an attrition mill with about 2500 grams of 3-mm diameter zirconia grinding media and about 200 ml of isopropyl alcohol. This slurry was attrition milled for six hours and then dried and sieved through a 200-mesh screen. The surface area of this nano-composite cathode powder was 120.30 m$^2$/gram. Powder samples (15-20 grams) were then calcined at various temperatures and surface areas were measured. Data for surface area versus calcination temperature are provided in Table 2. Screen-printing inks were prepared for nano-composite electrode powders calcined at 850, 900, 950, and 1000° C. These inks were prepared by dispersing 5 grams of composite powder into a commercial terpineol-based ink vehicle (Heraeus, No. V-006) using a three-roll mill. The solids content of the inks was about 30 volume percent and the viscosity was about 20 Pa-sec at 13 s$^{-1}$. Circular patterns (1.27 cm diameter) were deposited by screen printing onto opposite faces of the 300-micron GDC discs from Example 3. The electrode-coated GDC disc was then annealed at 950° C. for 1 hours so that the electrodes adhered to the GDC discs. After annealing, thicknesses of the electrode coatings were about 50 microns. Electrical testing of this sample was performed, as described under Example 26.

EXAMPLE 26

The GDC discs with electrode coatings, prepared as described in Examples 18-25, were subjected to electrical testing to verify the beneficial effects obtained by using the nano-composite electrodes and methods for preparing these nano-composite electrodes. The same measurement protocol was used for all samples. Silver paste was applied to the electrode surfaces, and two silver lead wires were attached to each electrode face. A digital voltmeter was used to measure the resistance of the electrode GDC discs at temperatures between 400 and 800° C. Two resistance measurements were made at each temperature (with opposite polarities), the average of the two resistance measurements was determined and recorded. This resistance corresponds to the total of the ohmic resistance of the GDC electrolyte, the resistance associated with the interfaces between the electrolyte and electrodes (where electrochemical reactions take place), and the ohmic resistance of the electrodes themselves (which is negligible). The resistance associated with the GDC electrolyte was calculated from the specimen geometry using ionic conductivity data obtained on GDC ceramics as described under Example 3 (see FIG. 1). After subtracting the electrolyte component, the resulting resistance value was assumed to be the resistance associated with the electrodes, which was primarily due to interfacial resistance. The specific electrode resistance (or normalized to the electrode area) value was calculated by multiplying by the electrode area (1.267 cm$^2$) and dividing by two (the number of electrodes per sample). For most applications, target values for specific electrode resistance are about 0.15 Ω-cm$^2$ or lower at the operating temperature.

Figure 15:
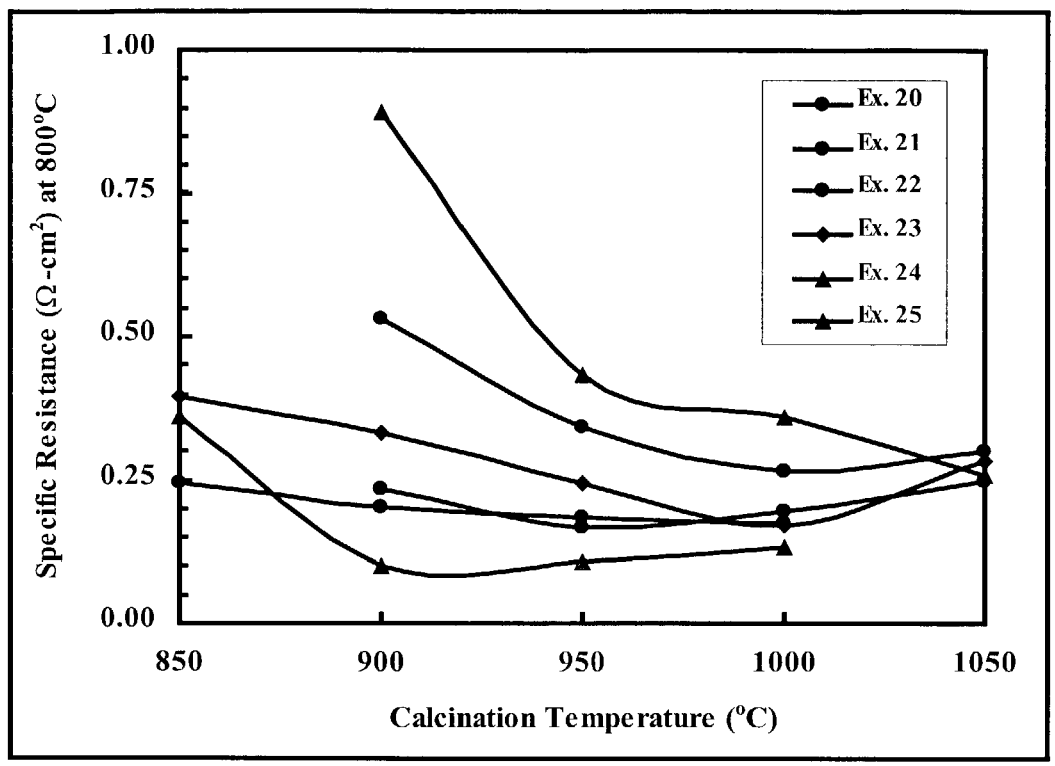
FIG. 15 is a plot showing the effect of calcination temperature on the specific electrode resistance at 800° C. for nano-composite electrodes prepared as described under Examples 20 through 25.
Figure 16:
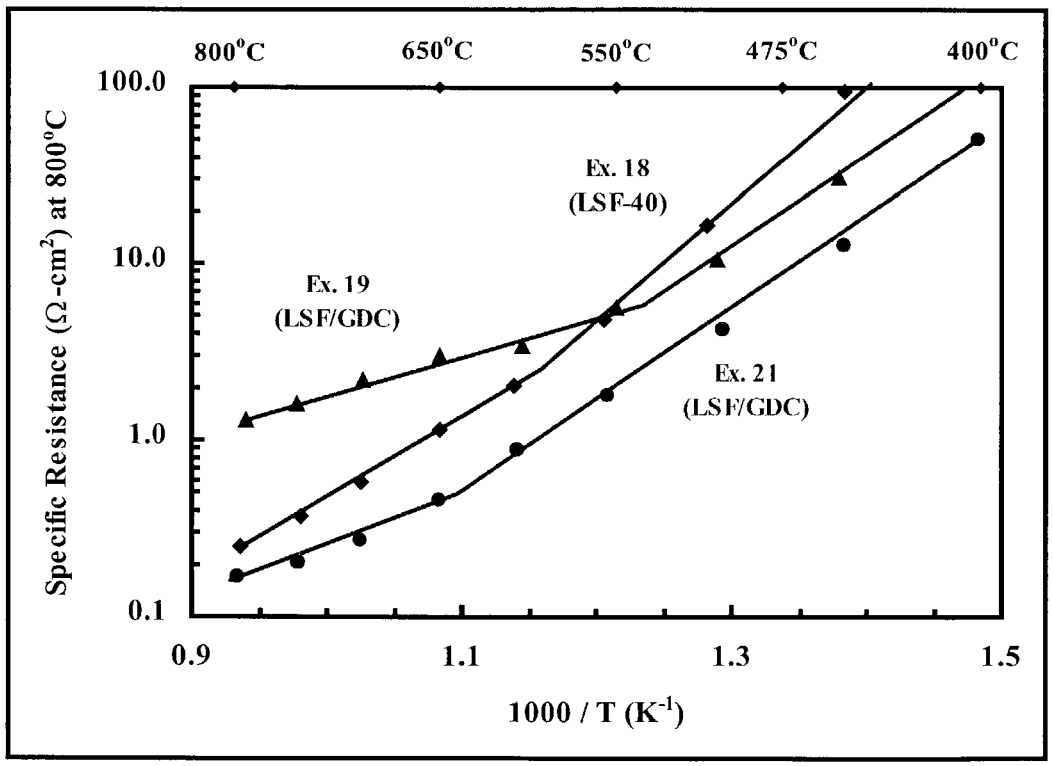
FIG. 16 is an Arrhenius plot showing temperature dependence of specific electrode resistance of single-phase LSF-40 electrodes of Comparative Example 18, coarse-composite LSF/GDC electrodes (40 vol % GDC) of Comparative Example 19, and nano-composite LSF/GDC electrodes (40 vol % GDC) of Example 21.
Figure 17:
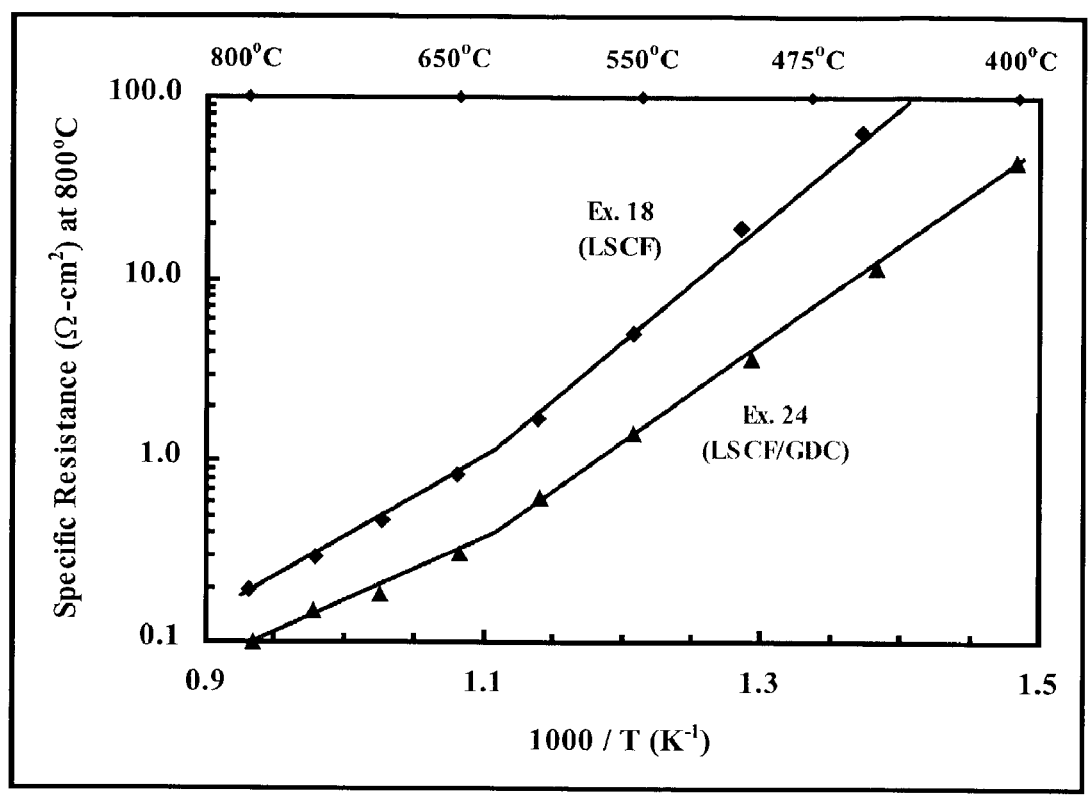
FIG. 17 is an Arrhenius plot showing temperature dependence of specific electrode resistance of LSCF electrodes of Comparative Example 18, and nano-composite LSCF/GDC electrodes (30 vol % GDC) of Example 24.

Results of the electrical measurements are summarized by data presented in FIGS. 15, 16, and 17. It is very apparent that the nano-composite approach, when proper calcination conditions are used prior to preparation of screen-printing inks, provides significant performance advantages compared to either the single-phase perovskite electrode materials (see FIGS. 15 and 16), or coarse-composite electrode materials (see FIG. 16). The importance of using a high surface area GDC electrolyte powder in conjunction with the process for making nano-composite electrodes is clearly shown by electrode resistance data obtained for Examples 19 and 21 (see FIG. 16). Nano-composite LSF/GDC electrodes prepared from a GDC powder with a surface area of about 36 m$^2$/gram (Example 19) had much higher electrode resistances than nano-composite LSF/GDC electrodes prepared from a GDC powder with a surface area of about 150 m$^2$/gram (Example 21).

All of the electrode materials tested showed the same type of temperature dependence, with a change in slope of Arrhenius plots, corresponding to higher activation energy at lower temperatures and lower activation energy at higher temperatures. This can be explained on the basis of electrode performance being limited by polarization (i.e., charge transfer) at lower temperatures and by mass transport (i.e., conductivity) at higher temperatures. The nano-composite approach improves electrode performance over the entire temperature range of the measurements, but this effect was most pronounced at lower temperatures in the polarization-dominated regime.

As shown in FIG. 17, it is critical that the proper calcination temperature is used after mixing of the electrolyte and electrode powders in order to achieve the lowest electrode resistance. The performance of each of the nano-composite electrode formulation is modulated by the starting surface areas of the component materials, the relative volume fractions of each component, and the calcination temperature used after mixing and before preparation of screen-printing inks. If the calcination temperature is too high, then performance can be degraded either by reaction between the two phases or due to loss of active surface area for reaction. When the calcination temperature is too low, the performance can be degraded due to poor particle-to-particle contact (and loss of electrical conductivity) in the highly conductive perovskite phase. The optimum calcination temperature depends on specifics of the formulation (e.g., relative volume fractions of each phase, and the starting particle size and surface area of each phase, the degree of mixedness achieved prior to calcination, and the surface area of the nano-composite powder after calcination. By following the teachings of this patent, one can design an optimum nano-composite electrode material for a given set of end-member compositions.

Throughout this specification, when a range of conditions or a group of substances is defined with respect to a particular characteristic (e.g., temperature, time, and the like) of the present invention, the present invention relates to and explicitly incorporates each and every specific member and combination of sub-ranges or sub-groups therein. Any specified range or group is to be understood as a shorthand way of referring to each and every member of a range or group individually as well as each and every possible sub-range and sub-group encompassed therein; and similarly with respect to any sub-ranges or sub-groups therein. Thus, for example, a time of 10 to 15 minutes is to be understood as specifically incorporating each and every individual time, as well as sub-range, such as, for example, 11 minutes, 12 minutes, 10 to 13 minutes, 10.5 to 15 minutes, 10 to 15 minutes, etc.

From the foregoing disclosure and detailed description of certain preferred embodiments, it will be apparent that various modifications, additions and other alternative embodiments are possible without departing from the scope and spirit of the present invention. The embodiments discussed were chosen and described to provide the best illustration of the principles of the present invention and its practical application to thereby enable one of ordinary skill in the art to use the invention in various embodiments and with various modifications as are suited to the particular use contemplated. All such modifications and variations are within the scope of the present invention as determined by the appended claims when interpreted in accordance with the benefit to which they are fairly, legally, and equitably entitled. The descriptions and disclosures herein are intended solely for purposes of illustration and should not be construed as limiting the scope of the present invention which is described by the following claims.

What is claimed is:

1. A method of making a ceramic electrode, comprising the steps of:
providing a nanoscale electrolyte powder having a surface area >50 m$^2$/gram;

dispersing the electrolyte powder in water having an adjusted pH<7;

dissolving an electrode powder in the dispersion, the electrode powder being a water soluble precursor to a metal selected from nickel, copper, silver, and combinations thereof;

adding the dispersion to an aqueous solution of a base to cause precipitation of the metal precursor on the surface of the nanoscale electrolyte powder;

calcining the precipitated solids; and forming an electrode that comprises the calcinated solids.

2. The method of claim 1, wherein the nanoscale electrolyte powder has a surface area $\geq 100$ m$^2$/gram.

3. The method of claim 1, wherein the nanoscale electrolyte powder is selected from yttrium-stabilized zirconia, a doped ceria electrolyte material, barium zirconate, scandium-doped zirconia, a lanthanum gallate based ceramic electrolyte material, a bismuth oxide based electrolyte material, and combinations thereof.

4. The method of claim 1, wherein precipitated solids comprise 30 to 70 volume percent of the electrolyte material.

5. A method of making a ceramic electrode, comprising the steps of:

providing an electrode powder;

adding a nanoscale electrolyte powder having a surface area >50 m$^2$/gram to the electrode powder;

mixing the electrode powder with the nanoscale electrolyte powder by a mixing method selected from attrition milling and ball milling;

calcining the milled powder mixture; and forming an electrode that comprises the calcinated powder mixture.

6. The method of claim 5, wherein the nanoscale electrolyte powder has a surface area $\geq 100$ m$^2$/gram.

7. The method of claim 5, further comprising the step of:

milling the calcined powder mixture.

8. The method of claim 5, wherein the mixing step comprises the steps of:

milling the electrolyte powder and the electrode powder in the presence of a surfactant;

drying the milled powder mixture; and sieving the milled powder mixture.

9. The method of claim 5, further comprising the step of:

calcining the electrolyte powder.

10. The method of claim 5, wherein the nanoscale electrolyte powder is selected from yttrium-stabilized zirconia, a doped ceria electrolyte material, barium zirconate, scandium-doped zirconia, a lanthanum gallate based ceramic electrolyte material, a bismuth oxide based electrolyte material, and combinations thereof.

11. The method of claim 5, wherein the electrode powder is selected from (1) an electrically conducting ceramic material and (2) a powder precursor to a metal selected from nickel, copper, and combinations thereof.

12. The method of claim 11, wherein the electrode powder comprises an electrically conducting ceramic material and the powder mixture comprises 20 to 50 volume percent of the electrolyte material.

13. The method of claim 11, wherein the electrode powder comprises a powder precursor to a metal and the powder mixture comprises 30 to 70 volume percent of the electrolyte material.

14. The method of claim 11, wherein the precursor to a metal is selected from nickel oxide, nickel carbonate, nickel nitrate, nickel hydroxide, copper oxide, copper carbonate, copper nitrate, and combinations thereof.

15. The method of claim 11, wherein the electrode powder is a perovskite ceramic electrode material that satisfies the formula $(A_{1-x}B_x)(C_{1-y}D_y)O_{3-z}$, where A is a lanthanide element, B is an alkaline earth element, and C and D are transition elements.

16. The method of claim 15, wherein the perovskite ceramic electrode material is selected from lanthanum strontium manganite, praseodymium strontium manganese iron oxide, lanthanum strontium ferrite, lanthanum strontium cobalt ferrite, lanthanum calcium manganite, lanthanum calcium cobalt ferrite, praseodymium strontium manganite, praseodymium strontium ferrite, samarium strontium cobaltite, and combinations thereof.

17. A method of making a ceramic electrode, comprising the steps of:

providing an electrode powder comprising an electrically conducting ceramic material;

adding a nanoscale electrolyte powder having a surface area >50 m$^2$/gram to the electrode powder;

mixing the electrode powder with the nanoscale electrolyte powder by a method selected from attrition milling and ball milling;

calcining the milled powder mixture; and forming an electrode that comprises the calcinated powder mixture.

18. The method of claim 17, wherein the nanoscale electrolyte powder has a surface area $\geq 100$ m$^2$/gram.

19. The method of claim 17, further comprising the step of:

milling the calcined powder mixture.

20. The method of claim 17, wherein the mixing step comprises the steps of:

milling the electrolyte powder and the electrode powder in the presence of a surfactant;

drying the milled powder mixture; and sieving the milled powder mixture.

21. The method of claim 17, further comprising the step of:

calcining the electrolyte powder.

22. The method of claim 17, wherein the nanoscale electrolyte powder is selected from yttrium-stabilized zirconia, a doped ceria electrolyte material, barium zirconate, scandium-doped zirconia, a lanthanum gallate based ceramic electrolyte material, a bismuth oxide based electrolyte material, and combinations thereof.

23. The method of claim 17, wherein the powder mixture comprises 20 to 50 volume percent of the electrolyte powder.

24. The method of claim 17, wherein the electrode powder is a perovskite ceramic electrode material that satisfies the formula $(A_{1-x}B_x)(C_{1-y}D_y)O_{3-z}$, where A is a lanthanide element, B is an alkaline earth element, and C and D are transition elements.

25. The method of claim 24, wherein the perovskite ceramic electrode material is selected from lanthanum strontium manganite, praseodymium strontium manganese iron oxide, lanthanum strontium ferrite, lanthanum strontium cobalt ferrite, lanthanum calcium manganite, lanthanum calcium cobalt ferrite, praseodymium strontium manganite, praseodymium strontium ferrite, samarium strontium cobaltite, and combinations thereof.

26. A method of making a ceramic electrode, comprising the steps of:

providing an electrode powder comprising a powder precursor to a metal selected from nickel, copper, and combinations thereof;

adding a nanoscale electrolyte powder having a surface area >50 m$^2$/gram to the electrode powder;

mixing the electrode powder with the nanoscale electrolyte powder by a method selected from attrition milling and ball milling;

calcining the milled powder mixture; and forming an electrode that comprises the calcinated powder mixture.

27. The method of claim 26, wherein the nanoscale electrolyte powder has a surface area $\geq 100$ m$^2$/gram.

28. The method of claim 26, further comprising the step of:
milling the calcined powder mixture.

29. The method of claim 26, wherein the mixing step comprises the steps of:

milling the electrolyte powder and the electrode powder in the presence of a surfactant;

drying the milled powder mixture; and sieving the milled powder mixture.

30. The method of claim 26, further comprising the step of:
calcining the electrolyte powder.

31. The method of claim 26, wherein the nanoscale electrolyte powder is selected from yttrium-stabilized zirconia, a doped ceria electrolyte material, barium zirconate, scandium-doped zirconia, a lanthanum gallate based ceramic electrolyte material, a bismuth oxide based electrolyte material, and combinations thereof.

32. The method of claim 26, wherein the powder mixture comprises 30 to 70 volume percent of the electrolyte powder.

33. The method of claim 26, wherein the powder precursor to a metal is selected from nickel oxide, nickel carbonate, nickel nitrate, nickel hydroxide, copper oxide, copper carbonate, copper nitrate, and combinations thereof.

34. A method of making a ceramic electrode, comprising the steps of:

providing an electrode powder comprising lanthanum strontium ferrite;

adding a nanoscale electrolyte powder comprising a doped ceria electrolyte material having a surface area >50 m$^2$/gram to the electrode powder;

mixing the lanthanum strontium ferrite powder with the doped ceria electrolyte material to form a mixture comprising 20 to 50 volume percent doped ceria electrolyte material, the mixing method being selected from attrition milling and ball milling; and forming an electrode that comprises the mixture.

35. The method of claim 34, further comprising the step of:
calcining the milled powder mixture at a temperature of at least 850° C.

36. The method of claim 35, further comprising the step of:
milling the calcined powder mixture.

37. A method of making a ceramic electrode, comprising the steps of:

providing an electrode powder comprising lanthanum strontium cobalt ferrite;

adding a nanoscale electrolyte powder comprising a doped ceria electrolyte material having a surface area >50 m$^2$/gram to the lanthanum strontium cobalt ferrite;

mixing the lanthanum strontium cobalt ferrite with the doped ceria electrolyte material to form a mixture comprising about 20 to 50 volume percent doped ceria electrolyte material, the mixing method being selected from attrition milling and ball milling; and forming an electrode that comprises the mixture.

38. The method of claim 37, further comprising the step of:
calcining the milled powder mixture at a temperature of at least 850° C.

39. The method of claim 38, further comprising the step of:
milling the calcined powder mixture.

* * * * *